United States Patent
Parekh

(10) Patent No.: US 12,254,998 B2
(45) Date of Patent: Mar. 18, 2025

(54) METHOD OF MAKING A MERCURY BASED COMPOUND, MERCURY BASED COMPOUND, METHODS OF USING THE MERCURY BASED COMPOUND AND USES OF THE MERCURY BASED COMPOUND

(71) Applicant: Suneel Navnitdas Parekh, Mumbai (IN)

(72) Inventor: Suneel Navnitdas Parekh, Mumbai (IN)

( * ) Notice: Subject to any disclaimer, the term of this patent is extended or adjusted under 35 U.S.C. 154(b) by 0 days.

(21) Appl. No.: 18/361,188

(22) Filed: Jul. 28, 2023

(65) Prior Publication Data

US 2024/0120124 A1    Apr. 11, 2024

Related U.S. Application Data

(63) Continuation of application No. 15/569,238, filed as application No. PCT/IB2016/000305 on Mar. 16, 2016, now abandoned.

(30) Foreign Application Priority Data

May 12, 2015  (IN) .......................... 1874/MUM/2015
Jul. 9, 2015   (IN) .......................... 2612/MUM/2015

(51) Int. Cl.
| | | |
|---|---|---|
| *G21G 5/00* | (2006.01) | |
| *C01B 32/907* | (2017.01) | |
| *C01G 13/00* | (2006.01) | |
| *C01G 13/04* | (2006.01) | |
| *C01G 35/00* | (2006.01) | |
| *C01G 53/00* | (2006.01) | |
| *C01G 55/00* | (2006.01) | |
| *G21B 3/00* | (2006.01) | |
| *G21F 9/06* | (2006.01) | |
| *G21F 9/28* | (2006.01) | |
| *G21F 9/30* | (2006.01) | |

(52) U.S. Cl.
CPC ............ *G21G 5/00* (2013.01); *C01B 32/907* (2017.08); *C01G 13/00* (2013.01); *C01G 13/006* (2013.01); *C01G 13/04* (2013.01); *C01G 35/006* (2013.01); *C01G 53/006* (2013.01); *C01G 55/002* (2013.01); *G21B 3/00* (2013.01); *G21F 9/06* (2013.01); *G21F 9/28* (2013.01); *G21F 9/30* (2013.01); *C01P 2002/72* (2013.01); *C01P 2002/74* (2013.01); *C01P 2002/82* (2013.01); *C01P 2002/86* (2013.01); *C01P 2002/89* (2013.01); *C01P 2004/03* (2013.01); *C01P 2004/04* (2013.01); *C01P 2004/61* (2013.01); *C01P 2004/64* (2013.01); *C01P 2006/42* (2013.01)

(58) Field of Classification Search
CPC ...... G21G 5/00; C01B 32/907; C01G 313/00; C01G 13/006; C01G 13/04; C01G 35/006; C01G 53/006; C01G 55/002; G21B 3/00; G21F 9/06; G21F 9/28; G21F 9/30; C01P 2002/72; C01P 2002/74; C01P 2002/82; C01P 2002/86; C01P 2002/89; C01P 2004/03; C01P 2004/04; C01P 2004/61; C01P 2004/64; C01P 2006/42

USPC ....................................................... 423/491

See application file for complete search history.

(56) References Cited

U.S. PATENT DOCUMENTS

| | | | |
|---|---|---|---|
| 740,855 | A | 10/1903 | Hoessle |
| 2,027,364 | A | 1/1936 | Baird |
| 3,792,069 | A | 2/1974 | Baird, Jr. |
| 4,731,187 | A | 3/1988 | Moriya et al. |
| 5,034,054 | A | 7/1991 | Woodward |
| 5,294,417 | A | 3/1994 | Moore et al. |
| 5,601,795 | A | 2/1997 | Ball |
| 10,270,289 | B2 | 11/2019 | Tsuchida |
| 10,470,289 | B2 | 11/2019 | Tsuchida |
| 2014/0255279 | A1 | 9/2014 | Olson |
| 2015/0160944 | A1 | 6/2015 | Bank et al. |

FOREIGN PATENT DOCUMENTS

| | | |
|---|---|---|
| CN | 104338561 A | 2/2015 |
| JP | S4855194 A | 8/1973 |
| JP | 55062354 A | 5/1980 |
| RO | 101720 B | 11/1991 |
| TW | 201414362 A | 4/2014 |
| WO | 9320011 A1 | 10/1993 |

OTHER PUBLICATIONS

PCT, International Search Report for International Patent Application No. PCT/IB2016/000305 dated Jun. 28, 2016.
PCT, Written Opinion of the International Searching Authority for International Patent Application No. PCT/IB2016/000305 dated Jun. 28, 2016.

(Continued)

*Primary Examiner* — Edward M Johnson

(74) *Attorney, Agent, or Firm* — Tautz & Schuhmacher LLC; Georg Hasselmann

(57) ABSTRACT

A mercury-based compound is in powder form and has the general chemical formula: $M1_aX_b$, where M1 is Hg, Mxc-Myd or a combination thereof, with Mx being Hg and My being an arbitrary element; wherein X is chloride, bromide, fluoride, iodide, sulphate nitrate or a combination thereof, wherein a, b, c and d are numbers between 0.1 and 10, wherein particles of the powder have a minimum average dimension of width of at least 50 nm and a maximum average dimension of width of at most 20 μm, and wherein the mercury-based compound is paramagnetic and is present in an excited state.

26 Claims, 15 Drawing Sheets

(56) References Cited

OTHER PUBLICATIONS

PCT, International Preliminary Report on Patentability for International Patent Application No. PCT/IB2016/000305 dated Nov. 14, 2017.
James Fromm, "Alchemy", published 1997.
David Mogk, Time-of-flight secondary ion mass spectrometry (ToF-SIMS), Montana State University, 2008.
Parikh, Dilip M. "Solids Drying: Basics and Applications." Chemical Engineering, Apr. 2014, pp. 42-45.
Chung, DongWoo. Cold Fusion: A Study in Scientific Controversy, Mar. 14, 2015, http://large.stanford.edu/courses/2015/ph241/chung2/.
Wittmann JJ, et al., "High-precision measurement of the electron spin g factor of trapped atomic nitrogen in the endohedral fullerene N@C60." Journal of Magnetic Resonance May 2018; 290:12-17. doi: 10.1016/j.jmr.2018.02.019. Epub Mar. 6, 2018.
Matson, John. "Fact or Fiction ?: Lead Can Be Turned into Gold." Scientific American, Jan. 31, 2014, www.scientificamerican.com/article/fact-or-fiction-lead-can-be-turned-into-gold/.
Simon, M., et al., "Mercury, Mercury Alloys, and Mecury Compounds", Ullmann's Encyclopedia of Industrial Chemistry, Jan. 1, 2012, pp. 559-594, vol. 22 XP055277094, ISBN: 978-3-827-30673-2.
MacRae, Michael. "Cold Fusion 25 Years Later." ASME, May 7, 2014, www.asme.org/topics-resources/content/cold-fusion-25-years-later.
Mindat.org copyright 1993-2020.
Manikowski, H. "Electron Paramagnetic Resonance of Radicals and Metal Complexes." Institute of Nuclear Chemistry and Technology , 2nd International Conference of the Polish EPR Association, vol. 28, 1996, p. 77.
Reactions of Mercury (Year: 2014).
"What Is the Current Scientific Thinking on Cold Fusion? Is There Any Possible Validity to This Phenomenon?" Scientific American, Oct. 21, 1999, www.scientificamerican.com/article/what-is-the-current-scien/.
Office action by the Israeli Patent Office issued in IL254857, to which this application claims priority, dated Mar. 2, 2021, and English-language translation thereof.
Office action by the Israeli Patent Office issued in IL254857, to which this application claims priority, dated May 24, 2021, and English-language machine translation thereof. The Office action being the Office action just prior to the Decision to Grant a Patent.

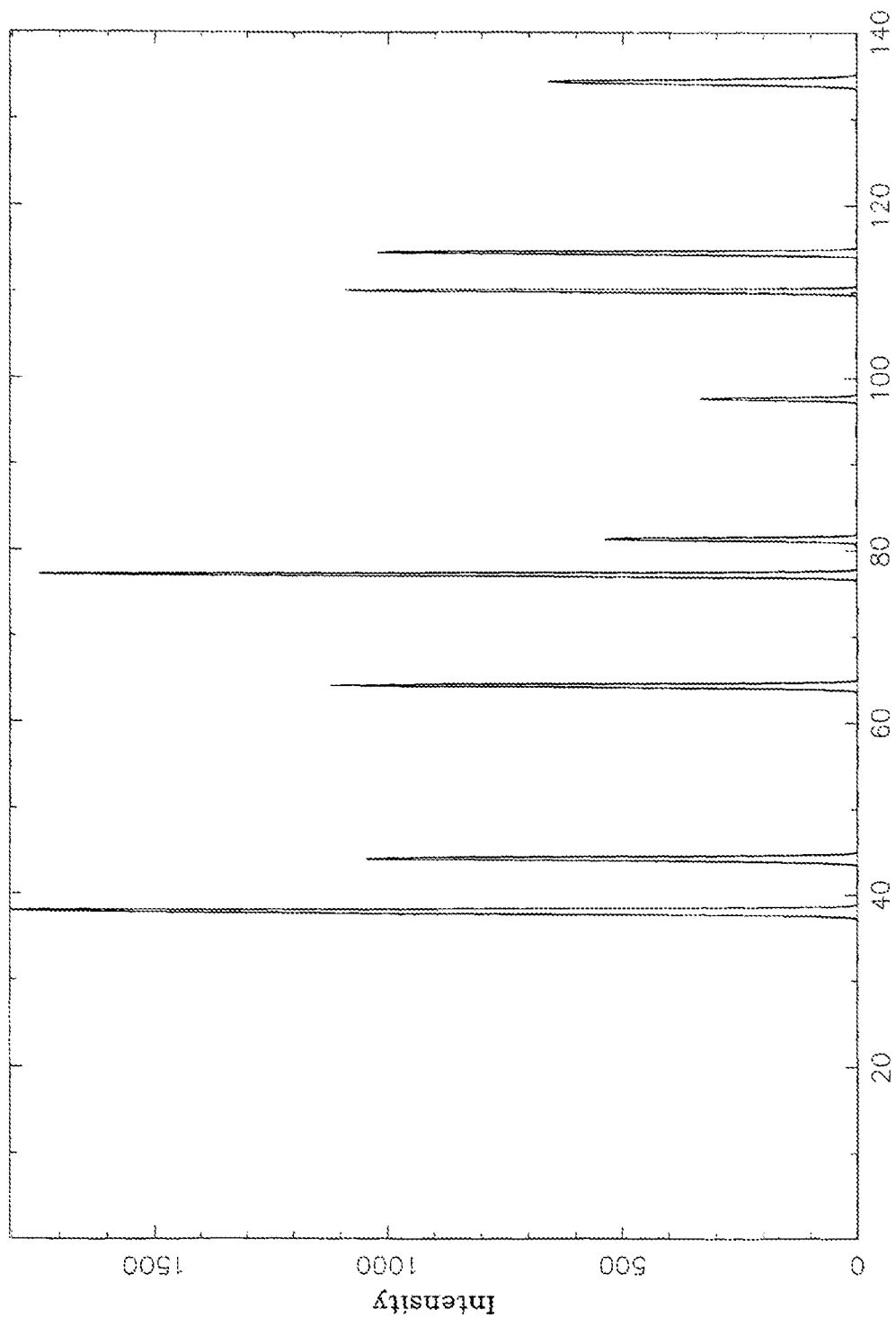

METHOD OF MAKING A MERCURY BASED COMPOUND, MERCURY BASED COMPOUND, METHODS OF USING THE MERCURY BASED COMPOUND AND USES OF THE MERCURY BASED COMPOUND

CROSS REFERENCE TO A RELATED APPLICATION

This application is a continuation application of U.S. Ser. No. 15/569,238, filed on Oct. 25, 2017, which is a National Stage Entry of PCT/IB2016/000305, filed on Mar. 16, 2023 and designating the United States, which claims priority to Indian Patent Application 1874/MUM/2015, filed on May 12, 2015 and 2612/MUM/2015, filed on Jul. 9, 2015, all of which are incorporated herein in their entireties.

TECHNICAL FIELD

The present disclosure relates to a method of making a mercury based compound, to a mercury based compound, to methods of using the mercury based compound and to uses of the mercury based compound. The mercury based compound may be in powder form at room temperature having the general chemical formula $M^1_a X_b$ where $M^1$ is selected from the group of compounds consisting of Mg, $M^x_c M^y_d$ or a combination thereof, with $M^x$ being Hg and $M^y$ being an arbitrary element; where Y is one of a chloride, bromide, fluoride, iodide, sulphate nitrate and a combination thereof; and where a, b, c, and d are numbers selected between 0.1 and 10. The mercury based compound is paramagnetic and in an excited state.

BACKGROUND

Nuclear transmutation is the conversion of one chemical element or isotope into another. In this connection it should be noted that each isotope is defined by the number of protons and neutrons in its atoms, i.e. in the atomic nucleus. During a nuclear transmutation process this number is changed, either the number of protons and/or the number of neutrons in the atom is/are changed. Typically transmutation can be achieved using either nuclear reactions (in which an outside particle reacts with a nucleus) or by radioactive decay (where no outside particle is needed).

Following the production of energy in e.g. a nuclear power plant the spent fuel rods comprising Pu and various other radioactive isotopes have to be stored for very long periods of time so that the highly radioactive isotopes have decayed sufficiently by radioactive decay in such a way that the spent fuel rods can be handled again.

In order to reduce the storage time of the spent fuel rods attempts have been made to convert the long lived radioactive isotopes into shorter lived isotopes using transmutation processes. However, the yield of such processes is extremely low and the cost of employing the currently known processes are very expensive and not economically viable to date.

SUMMARY

For this reason it is an object of the invention to provide a method of reducing the storage time of spent fuel rods to such an extent that these do not have to be stored for several centuries in an economically viable manner.

This object is satisfied through the use of a mercury based compound as described herein. The mercury based compound is manufactured according to a method comprising the steps of:
  providing a pure mineral acid, such as aqua regia, or a solution of mineral acid, such as aqua regia, in a container;
  adding liquid mercury to the container;
  reacting the mercury and the mineral acid to form a mixture; and
  drying the mixture to form the mercury based compound in powder form.

In this connection the reaction times to e.g. dissolve the mercury in the mineral acid, such as aqua regia, and to react the Hg in the mineral acid ranges from seconds to hours. It primarily depends on the mineral acid used and how reactive it is. The more reactive the used mineral acid is the shorter the period is to break down the mercury in the mineral acid, such as aqua regia.

In this connection it should be noted that the step of reacting the mercury with the mineral acid takes place almost immediately and the reacted mixture of mercury and the mineral acid is like a slurry.

It should further be noted that the step of reacting the mercury and the mineral acid to form a mixture means that the mercury and the mineral acid are contacted with one another to form the mixture.

It should further be noted that naturally occurring Hg is used in this method and thus includes any of its isotopes in as far as they are present.

By employing such a method a mercury based compound in powder form can be obtained at room temperatures and environmental pressures. Mercury is typically present in the liquid state. The use of a mineral acid, such as aqua regia, thus enables mercury to be present in powder form which renders a variety of further uses of the mercury based compound possible. Preferably the resultant mercury based compound comprises Di-mercury sulphate (Hg204S1) and Calomel (Cl2Hg2) in powder form, more specifically a mercury based compound comprising at least some of the following elements H, C, O, N, S, Cl, Nb, Ta, Zr, Ru, and Ni i.e. an organometallic compound.

It is preferred if the mineral acid is not only provided in the container but if it is formed in the container to form pure mineral acid before, after or during the step of adding the mercury. In this way the production of the mercury based compound can be tailored to specific uses of the mercury based compound. Moreover, mineral acids, such as aqua regia, are fairly reactive substances that react fairly quickly which results in not only a decomposition of the mercury in the mineral acid, but also of the mineral acid itself, such that the mineral acid quickly loses its effectiveness (yet remains a strong acid). Thus by forming the mineral acid on site a highly effective acid is made available to decompose the liquid mercury during the production of mercury based compound.

Advantageously the mineral acid comprises at least one acid selected from the group of acids consisting of aqua regia, $HNO_3$, HCL, and $H_2SO_4$. These acids can advantageously be used to form highly reactive forms of mineral acids. In this connection it should be noted that aqua regia is formed from 3 parts of concentrated HCl and of one part of concentrated $HNO_3$.

Preferably the ratio of mineral acid to mercury is selected from the range of between at least substantially 0.1 to 1 and 10:1 of mineral acid to mercury and preferably in the range of at least substantially 1:1 to 2:1.

In this way the ideal yield of mercury based compound is obtained. In this connection it should be noted that for example approximately 50 ml of aqua regia can be combined with 50 g of mercury in order to form between 40 g and 70 g of mercury based compound. In a different example 2 ml of mineral acid were added to 20 g of liquid mercury and resulted in 6.5 g of mercury based compound in powder form.

Advantageously the step of drying is carried out at a temperature selected in the range of 80° to 150° C., preferably of 90° to 140° C. for a time selected in the range of 30 mins to 10 hours. This ensures the ideal yield of dry mercury based compound at the end of the fabrication process.

It is furthermore preferred if the method further comprises the step of adding a solvent, with the solvent is selected from the group of solvents consisting of a polar protic solvent, e.g. formic acid, ethanol, acetic acid, water, a polar aprotic solvent, e.g. acetone, ammonia, ethyl acetate, and a non-polar solvent, e.g. toluene, benzene, chloroform and combinations thereof.

Once the mineral acid is added to the liquid mercury not only is a slurry formed containing mineral acid and the mercury based compound, but also residual liquid including a mixture containing remnants of the mineral acid, liquid mercury and reaction products can be present. In order to now facilitate the drying of the mercury based compound and hence to shorten the period of drying the slurry composed of the remaining mineral acid and the mercury based compound, the residual liquid can be separated by removing the residual liquid from the container to obtain the slurry including the mercury based compound.

On use of some types of mineral acid the mercury is completely reacted in the solution. In contrast to this other forms of mineral acid already have the mercury based compound present in slurry form and then the residual liquid can simply be poured off prior to drying the mercury based compound on e.g. a hot plate.

Preferably the method can further comprise at least one of the following steps:
maintaining an initial temperature of the mixture at room temperature;
heating the mixture, e.g. up to a temperature at which the mineral acid is evaporated to dry the mercury based compound;
isolating compounds that do not contain mercury from the mixture.

In this connection it should be noted that the aforesaid steps can be combined or are executed on their own.

In this connection it should also be noted that the step of adding the mercury to the container takes place before the mineral acid is added to the container. Preferably the mineral acid is added to the mercury relatively slowly to bring the mineral acid into contact with the liquid mercury to form the mixture and consequently the mercury based compound in slurry form.

It should further be noted that the step of isolating compounds that do not contain mercury can include a heating step, a separation step etc.

Such steps are advantageously used to facilitate the production of the mercury based compound.

In a further aspect the present invention relates to a mercury based compound in powder form having the general chemical formula:

$$M^1_a X_b$$

where $M^1$ is selected from the group of compounds consisting of Hg, $M^x_c M^y_d$ and a combination thereof, with $M^x$ being Hg and $M^y$ being an arbitrary element; where X is one of a halide, sulphate, nitrate and a combination thereof; and where a, b, c and d are numbers selected between 0.1 and 10.

Such a mercury based compound can advantageously be obtained by using a method as described herein.

Advantageously the halide is selected from the group of members consisting of chloride, bromide, fluoride, iodide and combinations thereof.

Advantageously the mercury based compound is present in powder form at room temperature. This renders the mercury based compound more versatile for certain applications.

Preferably the particles of the mercury based compound in powder form have a minimum average dimension of width of at least 50. nm and a maximum average dimension of width of at most 20 μm, in particular the particles of the powder have an average dimension of width which ranges from 100 nm to 10 μm.

Advantageously an XRD spectrum of the mercury based compound includes peaks corresponding to Di-mercury sulphate ($Hg_2O_4S_1$) and Calomel ($Cl_2Hg_2$), more specifically the peaks present in the XRD spectrum show mercury based compounds that include C, N, O, Cl, S, but is not limited to these compounds.

In an advantageous clause the mercury based compound is paramagnetic.

Generally speaking mercury based compounds found in the prior art are diamagnetic. This is because mercury is considered to be a diatomic metallic cation, made up of two mercury ions bonded to one another. In contrast to this the mercury based compound described herein is paramagnetic and hence has unpaired electrons.

The mineral acids are reacted with the liquid mercury, to form the mercury based compound. During the production of the mercury based compound and hence during the reaction of the liquid mercury with the mineral acid, some of the nuclei of the mercury metal ions are combined with some other nuclei of the mercury metal ions at room temperature. In this way not only the mercury based compound, but also new elements including H, C, N, O, S, Cl, Nb, Ta, Zr, Ru and Ni are formed as a fusion product.

Inspecting analysis results of the mercury based compound using FTIR, SEM EDS, XRD and TEM technology, shows the presence of the various new elements and shows that a fusion reaction has taken place.

In a further aspect the present invention relates to a method of producing metal compounds and metal elements in an endothermic reaction, the method comprising the steps of:
providing a metal target material, preferably of molten metal target material in a crucible, with the metal target material having a proton number of greater than or equal to 26,
adding the mercury based compound as described herein and/or a mercury based compound that is obtained using the method described herein to the metal target material; and
wherein the mercury based compound reacts with the metal target material to transmutate elements to produce low mass elements, such as hydrocarbons, and heavier elements.

In this connection it should be noted that the term low mass elements refers to elements that are lighter than the target material and can include H, C, N, O, S etc.

In this connection heavier elements refers to elements that are heavier than the elements of the metal target material.

In this way the mercury based compound described herein can be used as a source of energy in order to make e.g. rare earth elements and even enables the production of e.g. super heavy elements. Also nuclear waste can be treated to bring about a significantly more efficient transmutation of the radioactive long lived isotopes remaining in a spent fuel rod in order to form short lived isotopes and stable isotopes. This could solve the problems associated with the long term storage of nuclear waste and could e.g. be employed to reduce the level of radiation still present in Chernobyl and Fukushima, i.e. solves problems associated with the hazardous material and also environmental problems.

The energy present in the mercury based compound is thus used to react with nuclei of the target element which comprises materials ranging from iron to lead/bismuth and converts a percentage of the target elements into many other elements and their isotopes, including low mass elements, high mass elements, organometallic compounds of gold, silver and platinum group metals, hydrocarbons and high density elements, rare earth elements, heavy elements and generates fusion energy. It is believed that this is due to the binding energy between the incoming and outgoing components of the transmutation of the elements, i.e. a fusion reaction takes place between the mercury based compound and the target material.

For elements that weigh more than iron (a nucleus with 26 protons) the fusion process does not release energy and is known to be endothermic reaction where the energy of the mercury based compound energy reacts with the nucleus of the target elements/compound/alloys of iron and heavier elements.

The mercury based compound described herein has more energy than the individual components, such as the mercury and the mineral acid, used to form the mercury based compound. This means that on the formation of the mercury based compound the mercury is present in a state that is excited in comparison to the normal state of mercury. This excess in energy is believed to be the reason why the transmutation of the elements of the metal target material can take place.

As the mercury based compound is present in an excited state it should also be used fairly swiftly in order to obtain the maximum possible yield for the transmutation, before the mercury based compound can decay into the normal state of the mercury, i.e. the mercury based compound is to be added to the metal target material in the exited state before it has decayed into the normal state. Nevertheless, the mercury based compound can still be used e.g. after a year of storage time to produce results similar to those described herein, albeit at a lower yield.

In this connection it should be noted that although the underlying process is an endothermic reaction, some of the reactions taking place simultaneously can be exothermic reactions. The fusion of two masses that are generally lower than iron (which along with nickel has the largest binding energy per nucleon) generally releases energy, while the fusion of nuclei heavier than iron generally absorbs energy.

Advantageously the mercury based compound is used as a source of energy for transmutation of elements to create many new elements including rare earth elements and heavier elements.

Moreover, long lived radioactive elements are converted into short lived and stable elements. This is in particular advantageous when treating spent fuel rods that have been used in a nuclear reactor and include a wide spectrum of long lived radioactive isotopes.

Advantageously a bath of molten metal target material includes between 10 g and 1000000 Kg and most preferably between 30 g and 100 tons of metal target material. In this way both small amounts and large amounts of material can be treated using a mercury based compound. In this connection it should be noted that there is no real limit to the amount of metal target material used. The amount of material used generally depends on the size of the crucible available. Thus, provided a crucible of required size is available that amount of target material can be used. Nevertheless, the more metal is used the ratio of mercury based compound should be the same in order to obtain the same efficiency during the reaction.

Preferably a range of between 1 mg to 100 kg and most preferably between 150 mg and 10 kg of the mercury based compound are added to the bath. In this way both small amounts and large amounts of material can be treated using a mercury based compound to form new elements with higher proton and/or neutron numbers.

Advantageously the ratio of mass between the mercury based compound and the molten metal is selected from the range 1:100000 to 1:100, preferably is 1:10000. In this way the ideal yield of transmutation can be obtained.

Preferably the mercury based compound comprises energy and is employed as a source of energy with the energy reacting with nuclei of the target material in order to create elements having a higher proton number and/or higher neutron number.

In a further aspect the present invention relates to a method of producing metal compounds and metal elements in an exothermic reaction in a container such as a crucible, the method comprising the steps of:

providing target material with the target material having a proton number of less than or equal to 28, adding the mercury based compound described herein and/or that is obtained from the method of producing the mercury based compound described herein to the target material; and wherein the target material and the mercury based compound react to release energy and transmutate the elements to produce low mass elements, such as hydrocarbons, and heavier elements.

Such a process yields more than 1 mg of heavier elements for 100 g of target material. In this way this process is a highly effective transmutation process. Moreover, the energy released during the reaction can be used as a source of energy for the production of electricity and any application relating to energy.

In this connection it should be noted that low mass elements are elements that are lighter than the target material, such as H or He when e.g. Al is selected as the target material.

This means that through the addition of the mercury based compound to nuclei having a proton number of less than 28 a fusion process is started which releases energy (exothermic reaction), i.e. in the form of subatomic particles. This energy can be used for the generation of electricity and many other applications related with energy.

In this connection it should be noted that although the underlying process is an exothermic reaction, the reaction can also additionally be accompanied with endothermic reaction processes.

The mercury based metal compound can thus be used for the transmutation of elements and the production of energy from fusion reactions alone. The energy/power production can also be in the form of aneutronic fusion, which produces energy in the form of charged particles instead of neutrons.

This means that the energy from aneutronic fusion can be captured using direct conversion instead of the steam cycle, which would normally be used for neutrons. Direct conversion involves capturing charged particles to create a current. Aneutronic fusion greatly reduces problems associated with neutron radiation such as ionization damage, neutron activation, and requirements for biological shielding, remote handling, and safety.

Advantageously the (metal) target material is present in at least one of a gaseous phase, liquid phase and solid phase of matter. In this way all phases of matter can be used in order to produce energy.

Preferably the ratio of mass between the mercury based compound to the target material is selected from the range 1:100000 to 1:100, preferably is 1:10000. These ratios yield ideal reaction results.

In a preferred method, the mercury based compound is added in powder form or in the form of a slurry. In this connection a slurry means a mixture of the Mercury based compound and the mineral acid with which it was reacted, i.e. a slurry in the sense of this application means a mixture containing the mercury based compound, the mineral acid used to form the mercury based compound and possibly also some liquid mercury that has not reacted with the mineral acid.

In a further aspect the present invention relates to a use of the mercury based compound described herein and/or that can be obtained employing a method described herein for at least one of the following, namely the production of energy, the transmutation of elements, the formation of organometallic compounds for industrial and medical applications, the production of high density elements, such as Ag, Au and PGMs, the production of rare earth elements and the production of heavy elements.

In the following the invention will be described in detail with reference to the figures which show examples of specific clauses of the invention. In the figures there is shown:

BRIEF DESCRIPTION OF THE DRAWINGS

FIGS. 5a to 5d neutron powder diffraction results of pure aluminum target material (a), pure lead target material (b), pure copper target material (c) and (d) after a mercury based compound has been mixed with respective target material of FIGS. 5a to 5c;

FIGS. 8a and 8b TOF SIMS spectrum of the mercury based compound 8 mixed with Ni target material;

DESCRIPTION OF EXEMPLARY EMBODIMENTS

Figure 1A:
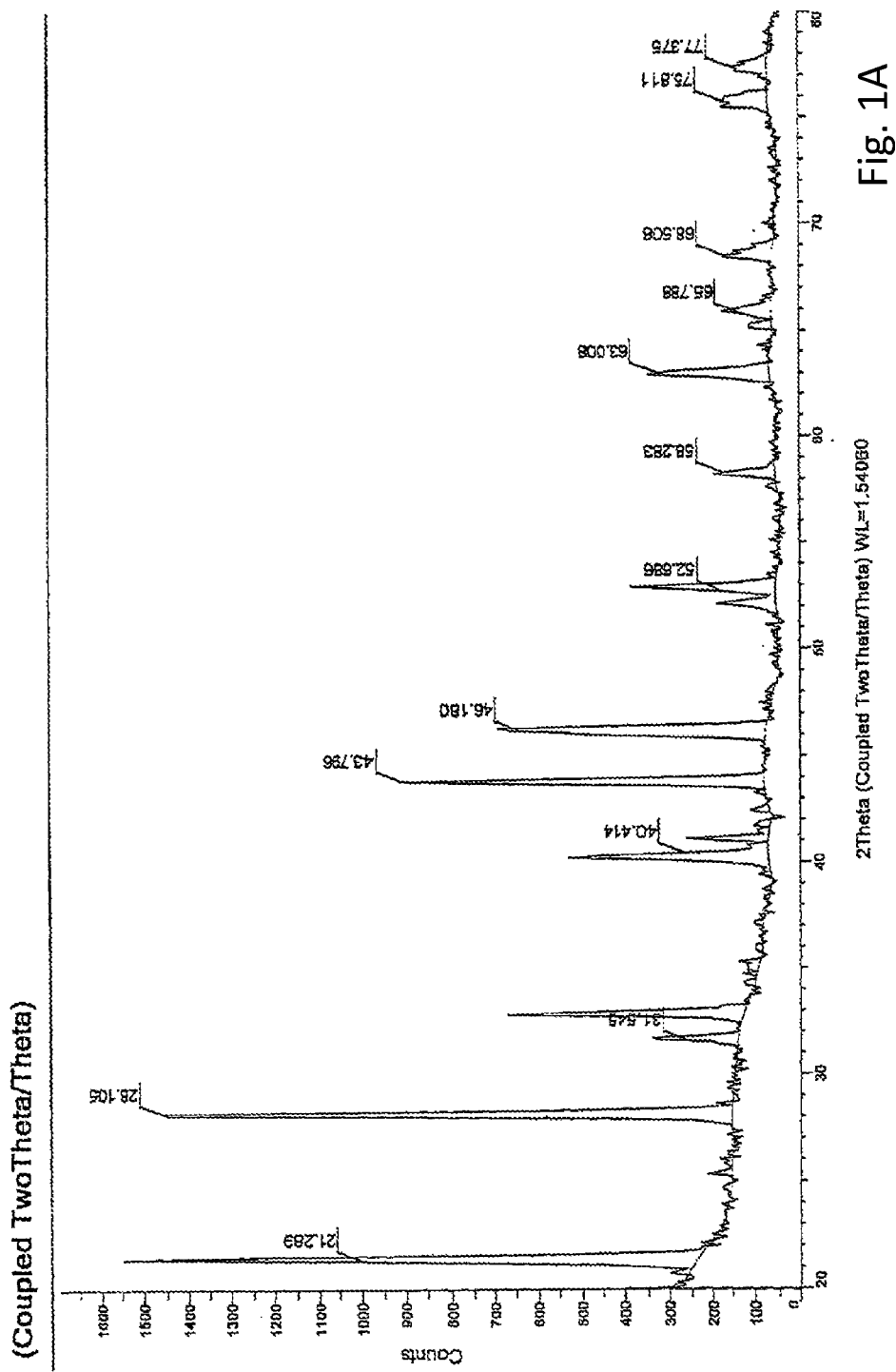
FIGS. 1a to 1c XRD spectra of various mercury based compounds produced using a method as described herein.

The method steps employed to form different mercury based compounds in powder form will be discussed on the basis of 10 examples in the following. In order to form the mineral acid, such as aqua regia, used to react with the mercury, the following acids and mercury (99%, i.e. pure mercury) listed below were used:

A) HCL 35% Merck Emplura 1.93401.0512 CH5C650706 UN 1789
B) $HNO_3$ 69% Merck Emplura 1.93406.0521 CG5C650516 UN 2031
C) $H_2SO_4$ 98% Merck Emplura 1.93400.0521 CF5C650465 UN 1830
D) MetalHg Merck GR Batch No. AF 0A00544 UN 2809/60440302501730

Compound Example 1—Aqua Regia $H_2SO_4$

A container in the form of a borosil beaker, a first beaker, having a capacity of 50 ml was provided. The following acids were subsequently provided in the first beaker using a pipette. Initially 15 ml of HCL were provided in the first beaker then 5 ml of $HNO_3$ were added to the HCL. The mixture was stored for 1 hour. Following which 5 ml of $H_2SO_4$ were gradually mixed into the first beaker to form a mineral acid, this was then stored for one hour. In a second beaker, also a borosil beaker, 18 g of Hg were provided and the mineral acid was gradually added to the contents present in the second beaker containing Hg. This started a reaction. The reaction was allowed to take place for 24 hours. This formed a slurry containing the mercury based compound and a mixture containing remnants of the mineral acid, liquid mercury and reaction products. After 24 hours the mixture containing the remnants was separated from the second beaker. In order to separate the mixture containing remnants from the slurry containing the particulate Hg bound by the mineral acid, the beaker was simply tilted and the mixture was poured off. The remaining slurry was then heated using a hot plate heated to temperatures ranging from 90° C. to 135° C. for 1.5 hours. This yielded 18 g of the mercury based compound in dry powder form.

Compound Example 2—Reverse Aqua Regia $H_2SO_4$ 15 ml of $HNO_3$ were placed in a first beaker then 5 ml of HCL were added. The acid solution was stored for 1 hour following which 5 ml of $H_2SO_4$ were gradually added to the acid solution to form a mineral acid. The mineral acid was then allowed to sit for one hour. In a second beaker 20 g of Hg were provided and the mineral acid was gradually added to the contents present in the second beaker containing Hg. This started a reaction. The reaction was allowed to take place for 24 hours. This formed a slurry containing the mercury based compound and a mixture containing remnants of the mineral acid, liquid mercury and reaction products. After 24 hours the mixture containing the remnants was separated from the second beaker. In order to separate the mixture containing remnants from the slurry containing the particulate Hg bound by the mineral acid, the beaker was simply tilted and the mixture was poured off. The remaining slurry was then heated using a hot plate heated to temperatures ranging from 90° C. to 135° C. for 1.5 hours. This yielded 20 g of mercury based compound in dry powder form.

Compound Example 3—Aqua Regia 15 ml of HCL were placed in a first beaker then 5 ml of $HNO_3$ were added to form a mineral acid. The mineral acid was stored for 1 hour. Thereafter 16 g of Hg were provided in a second beaker and the mineral acid was gradually added to the contents present in the second beaker containing Hg. This started a reaction. The reaction was allowed to take place for 24 hours. This formed a slurry containing the mercury based compound and a mixture containing remnants of the mineral acid, liquid mercury and reaction products. After 24 hours the mixture containing the remnants was separated from the second beaker. In order to separate the mixture containing remnants from the slurry containing the particulate Hg bound by the mineral acid, the second beaker was simply tilted and the mixture was poured off. The remaining slurry was then heated using a hot plate heated to temperatures ranging from 90° C. to 135° C. for 1.5 hours. This yielded 2.5 g of the mercury based compound in dry powder form.

Compound Example A—Reverse Aqua Regia 15 ml of $HNO_3$ were placed in a first beaker then 5 ml of HCL were added. The solution was stored for 1 hour. Following which 17 g of Hg were provided in a second beaker and the formed mineral acid was gradually added to the second beaker containing Hg. This started a reaction. The reaction was allowed to take place for 24 hours. This formed a slurry containing the mercury based compound and a mixture containing remnants of the mineral acid, liquid mercury and reaction products. After 24 hours the mixture containing the remnants was separated from the second beaker. In order to separate the mixture containing remnants from the slurry containing the particulate Hg bound by the mineral acid, the beaker was simply tilted and the mixture was poured off. The remaining slurry was then heated using a hot plate heated to temperatures ranging from 90° C. to 135° C. for 1.5 hours. This yielded 7 g of the mercury based compound in dry powder form.

Compound Example 5—$HNO_3$ and $H_2SO_4$ at a Ratio of 1:1

17 g of Hg were provided in a beaker, following which 17 ml of $HNO_3$ were gradually added. This started a reaction in which the Hg was completely dissolved in the $HNO_3$; within 10 to 15 minutes. Following which 17 ml of $H_2SO_4$ were gradually added to the mixture containing Hg and $HNO_3$. The following reaction caused a precipitation of material. The following reaction was allowed to take place for 10 hours. This formed a slurry containing the mercury based compound and a mixture containing remnants of the mineral acid and reaction products. After 10 hours the mixture containing the remnants was separated from the second beaker. In order to separate the mixture containing remnants from the slurry containing the particulate Hg bound by the mineral acid, the beaker was simply tilted and the mixture was poured off. The remaining slurry was then heated using a hot plate heated to temperatures ranging from 90° C. to 135° C. for 6 hours. This yielded 21 g of the mercury based compound in dry powder form.

Compound Example 6—$HNO_3$ and HCL at a Ratio of 1:1

16 q of Hg were provided in a beaker, following which 16 ml of $HNO_3$ were gradually added. This started a reaction in which the Hg was completely dissolved in the $HNO_3$ within 10 to 15 minutes. Following which 16 ml of HCL were gradually added to the $HNO_3$ solution containing Hg. The following reaction caused a precipitation of material. This formed a slurry containing the mercury based compound and a mixture containing remnants of the mineral acid and reaction products. After 10 hours the mixture containing the remnants was separated from the beaker. In order to separate the mixture containing remnants from the slurry containing the particulate Hg bound by the mineral acid, the beaker was simply tilted and the mixture was poured off. The remaining slurry was then heated using a hot plate heated to temperatures ranging from 90° C. to 135° C. for 3 hours until dry powder was available. This yielded 10 g of the mercury based compound in dry powder form.

Compound Example 7—$H_2SO_4$ and $HNO_3$ 10 ml:4 ml 10 g of Hg were provided in a beaker, following which 10 ml of $H_2SO_4$ were gradually added. The contents of the beaker was allowed to stand for 15 minutes before 4 ml of $HNO_3$ were gradually added. This started a reaction in which the Hg was completely brought into contact and reacted with the mineral acid formed by the $H_2SO_4$ and the $HNO_3$. The reaction was allowed to take place for 10 hours. This formed a slurry containing the mercury based compound and a mixture containing remnants of the mineral acid and further reaction products. After 10 hours the mixture containing the remnants was separated from the beaker. In order to separate the mixture containing remnants from the slurry containing the particulate Hg bound by the mineral acid, the first beaker was simply tilted and the mixture was poured off. The remaining slurry was then heated using a hot plate heated to temperatures ranging from 90° C. to 135° C. for 4 hours until the powder was dried. This yielded 15 g of mercury based compound in dry powder form.

Compound Example 8—Aqua Regia HCl 30 ml: $HNO_3$ 10 ml+$H_2SO_4$ 30 ml HCL were placed in a first beaker then 10 ml of $HNO_3$ were added. This resultant aqua regia was allowed to store for two hours. Following which 20 ml of the aqua regia were removed and placed into a third beaker. Following which 5 ml of $H_2SO_4$ were gradually mixed into the aqua regia to form a mineral acid. The mineral acid was allowed to store for two hours. From the prepared mineral acid 2 ml of solution were then taken and gradually added into a second beaker containing 20 g of Hg this was then stirred for 15 seconds, following which the reaction started. The reaction formed a slurry containing the mercury based Compound and a mixture containing remnants of the mineral acid, liquid mercury and reaction products. After 10 hours the mixture containing the remnants was separated from the second beaker. In order to separate the mixture containing remnants from the slurry containing the particulate Hg bound by the mineral acid, the second beaker was simply tilted and the mixture was poured off. The metal was then removed from the compound metal and heated on a hot plate heated to a temperature ranging from 90° C. to 135° C. for 1.5 hours until the solution became dry. This yielded 6.5 g of mercury based compound in dry powder form.

Compound Example 9—$HNO_3$ 11.3 g of Hg were placed in a beaker following which 11 ml of $HNO_3$ were added to the Hg. This started a reaction in which the Hg was completely dissolved in the HNO₃; within 15 minutes. The solution was heated for 1 hour on a hot plate at a temperature ranging from 90° C. to 135° C. Once the heating is started the precipitation starts. The heating step evaporated all of the acid and made the dry powder mercury based compound within one hour. This yielded 15 g of mercury based compound in powder form.

Compound Example 10—Aqua Regia HCL 15 ml:HNO₃ 5 ml 15 ml of HCL were placed in a first beaker following which 5 ml of HNO₃ were added to form a mineral acid. The mineral acid was kept for two hours. 10.9 g of Hg were placed into a second beaker and the mineral acid was gradually added in order to start the reaction. The reaction started and was kept in the beaker for one hour. The contents of the second beaker was stored on a hot plate and heated to a temperature ranging from 90° C. to 135° C. for 2.5 hours. This yielded 13.9 g of mercury based compound in dry powder form.

The mercury based compounds obtained employing the above methods were investigated using XRD, TEM, FTIR and SEM-EDS.

Table 1 below shows a list of prominent peaks observed in each of the spectra for the mercury based compounds 1 to 10 whose method of production is listed above. The peaks for the mercury based compounds 1, 2, and 8 can also be seen in FIGS. 1a to 1c.

| Compound | Peak [° 2θ] | Peak [° 2θ] | Peak [° 2θ] | Peak [° 2θ] | Peak [° 2θ] | Peak [° 2θ] |
|---|---|---|---|---|---|---|
| 1 | 21.289 | 28.105 | 40.414 | 43.796 | 52.686 | 63.008 |
| 2 | 22.744 | 29.467 | 35.011 | 41.238 | 55.802 | 62.893 |
| 4 | 28.987 | 31.679 | 37.322 | 39.898 | 46.854 | 55.840 |
| 5 | 22.880 | 29.485 | 42.108 | 50.898 | 62.909 | 67.959 |
| 6 | 21.474 | 26.493 | 31.715 | 33.110 | 37.218 | 55.219 |
| 7 | 22.898 | 26.404 | 27.146 | 29.590 | 44.384 | 55.985 |
| 8 | 21.344 | 28.056 | 40.782 | 43.769 | 45.906 | 65.893 |
| 9 | 22.126 | 27.975 | 31.563 | 36.985 | 45.932 | 62.890 |
| 10 | 29.025 | 32.716 | 37.170 | 46.160 | 51.587 | 66.486 |

Table 1 shows some of the most prominent peaks [at ° 2θ] yielded by the diffraction pattern in the XRD spectrum of the respective compounds 1 to 10. The six peaks shown are not always the most prominent peaks but are arbitrarily selected to show the variety of peaks present in the diffraction pattern.

Figure 1B:
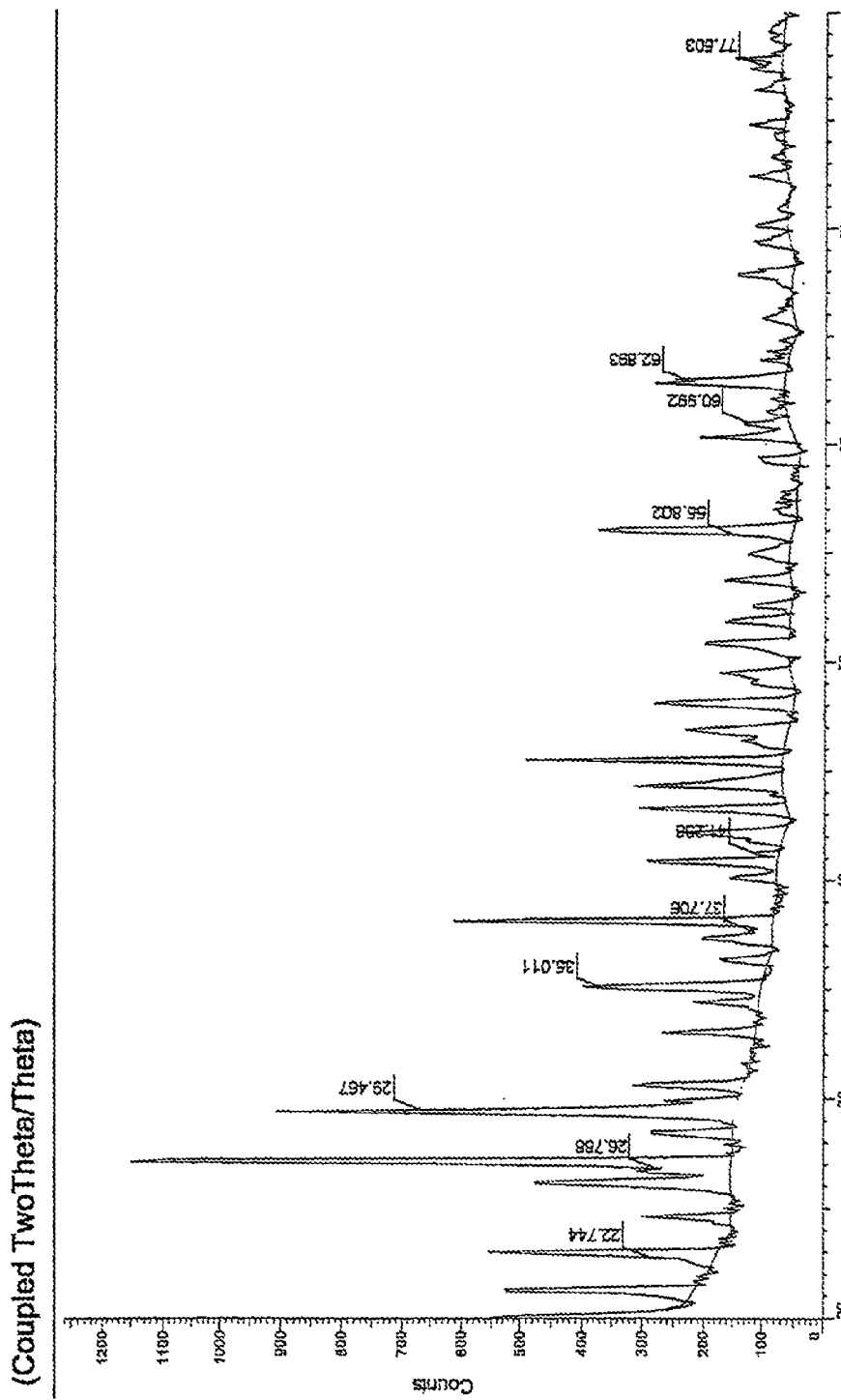
Figure 1C:
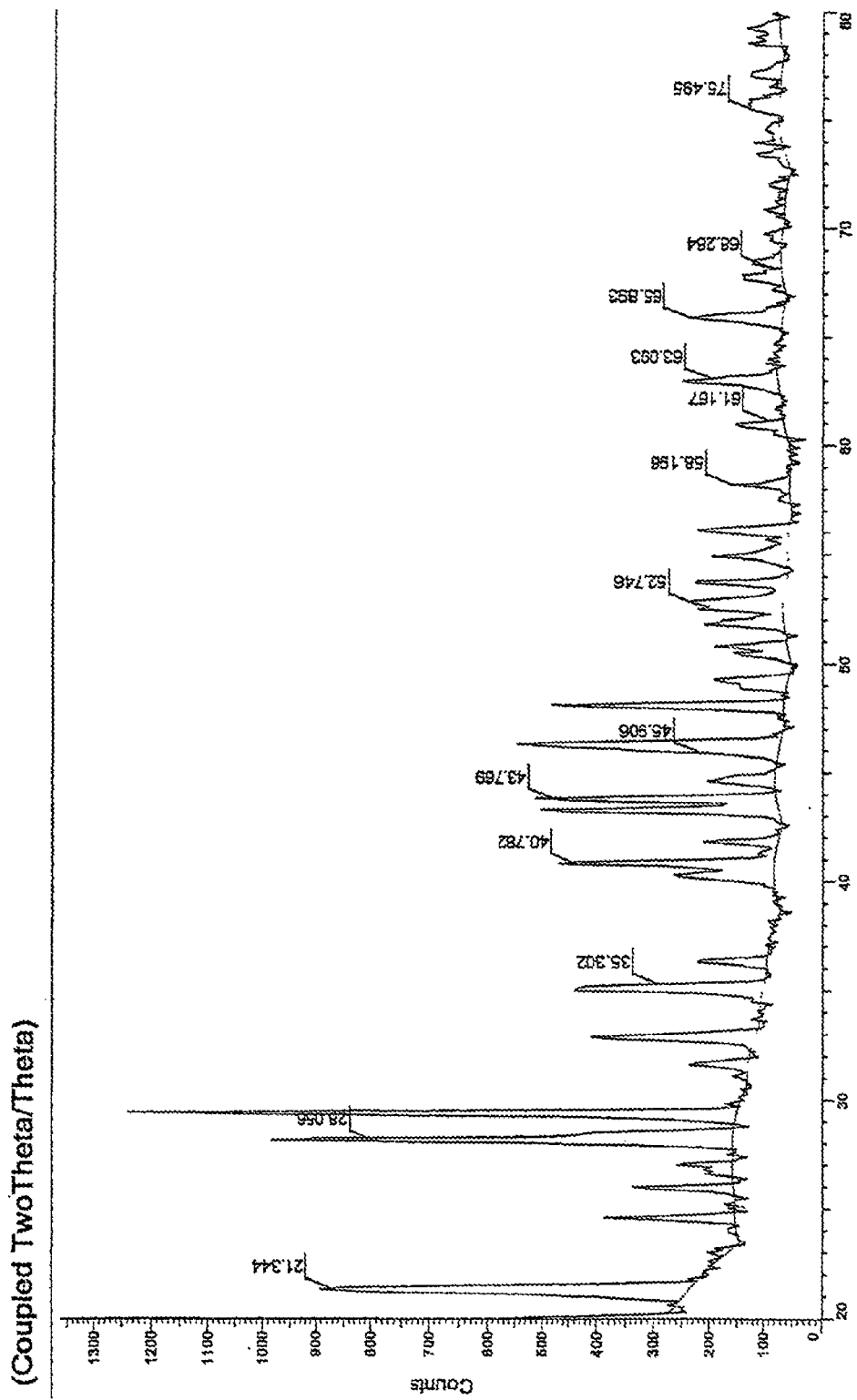

The X-ray powder diffraction (XRD) spectra shown in FIGS. 1a to 1c respectively, were taken with a stationary X-ray tube and the respective sample of powder was moved by the angle θ and the detector was simultaneously moved by the angle of 2θ. In FIG. 1a pronounced peaks can, amongst others be seen at 21.289, 28.105, 40.414, 43.796, 46.180 and 63.008.

FIG. 1b shows pronounced peaks at 22.744, 29.467, 35.011, 55.802, and 62.893. FIG. 1c shows pronounced peaks at 21.344, 28.056, 35.302, 40.782, 43.769, 63.093, and 65.893. Generally speaking the pronounced peaks shown in FIGS. 1a to 1c are indicative of Dimercury (I) Sulfate (VI) and of Calomel as well as of mercury compounds containing C, O, Cl, S, and Hg. The ratio of Dimercury (I) Sulfate (VI) to Calomel for the respective compounds is typically in the range of 85:15 to 95:5. In particular the ratio of Dimercury (I) Sulfate (VI) to Calomel of FIG. 1c is approximately 9:1.

Figure 2A:
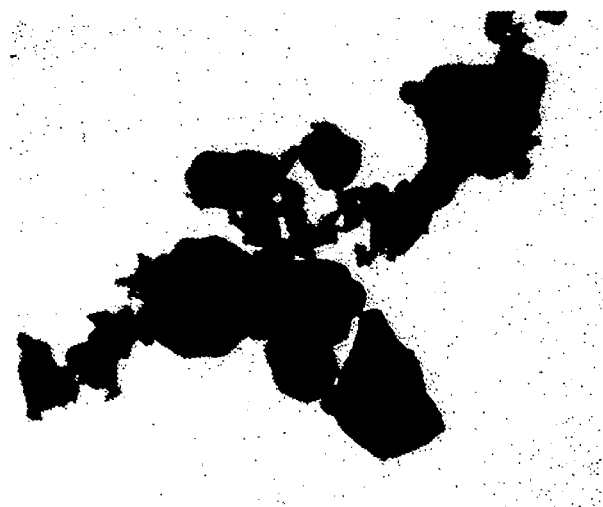
FIGS. 2a to 2c TEM images of various mercury based compounds produced using a method as described herein.
Figure 2B:
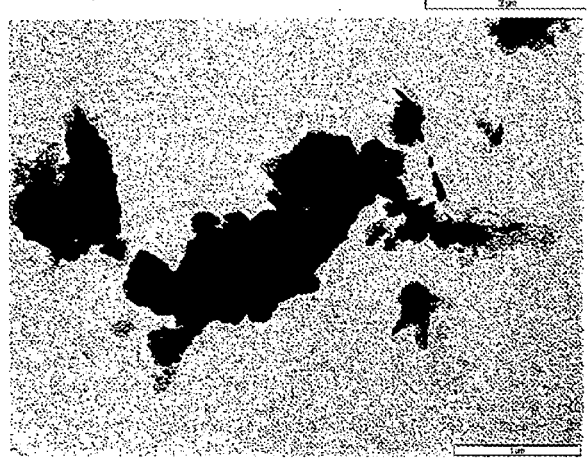
Figure 2C:
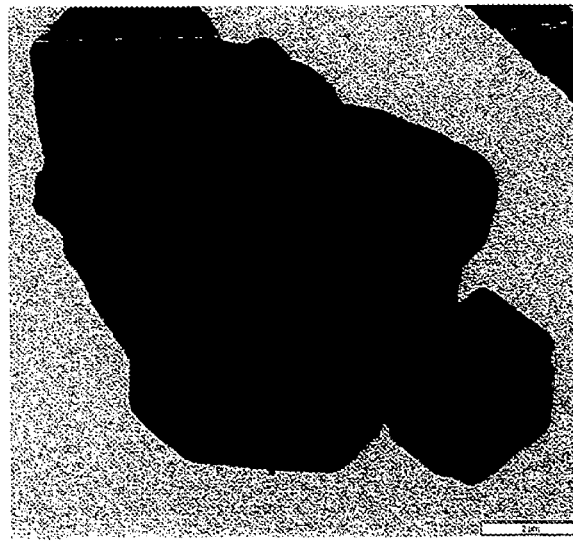

FIGS. 2a to 2c show TEM images of the same compounds 1, 2, and 8 produced using the methods discussed above. As can be seen particles of the powder obtained generally have average dimensional sizes of width of 100 nm to 3 μm in the samples shown. In other samples the average dimensional size may be as small as 50 nm and as large as 10 μm. These images show that a very fine powder is produced using the method in accordance with the invention to produce a mercury based compound.

Table 2 below shows that the mercury based compounds 1 to 10 produced using the methods described above form mercury based compounds comprising C, O, Cl, N, and S respectively.

| Compound | Element | Element | Element | Element | Element | Element | Element |
|---|---|---|---|---|---|---|---|
| 1 | C | O | Cl | Hg | Nb | Ta | — |
| 2 | C | O | Hg | S | Mo | — | — |
| 3 | C | O | Cl | Hg | — | — | — |
| 4 | C | O | Hg | — | — | — | — |
| 5 | C | O | S | Hg | — | — | — |
| 6 | C | O | Cl | Hg | — | — | — |
| 7 | C | O | S | Hg | — | — | — |
| 8 | C | O | S | Cl | Hg | Zr | Ru |
| 9 | C | O | Hg | — | — | — | — |
| 10 | C | O | Cl | Ni | Hg | — | — |

Table 2 shows the compounds revealed during SEM-EDS measurements of the respective compounds 1 to 10.

This mercury based compound thus has energy and this energy of the mercury based compound is used for the transmutation of the elements, i.e. the generation of fusion products which explains the presence of atoms, such as H, C, N, O, Zr, Ru.

Figure 3A:
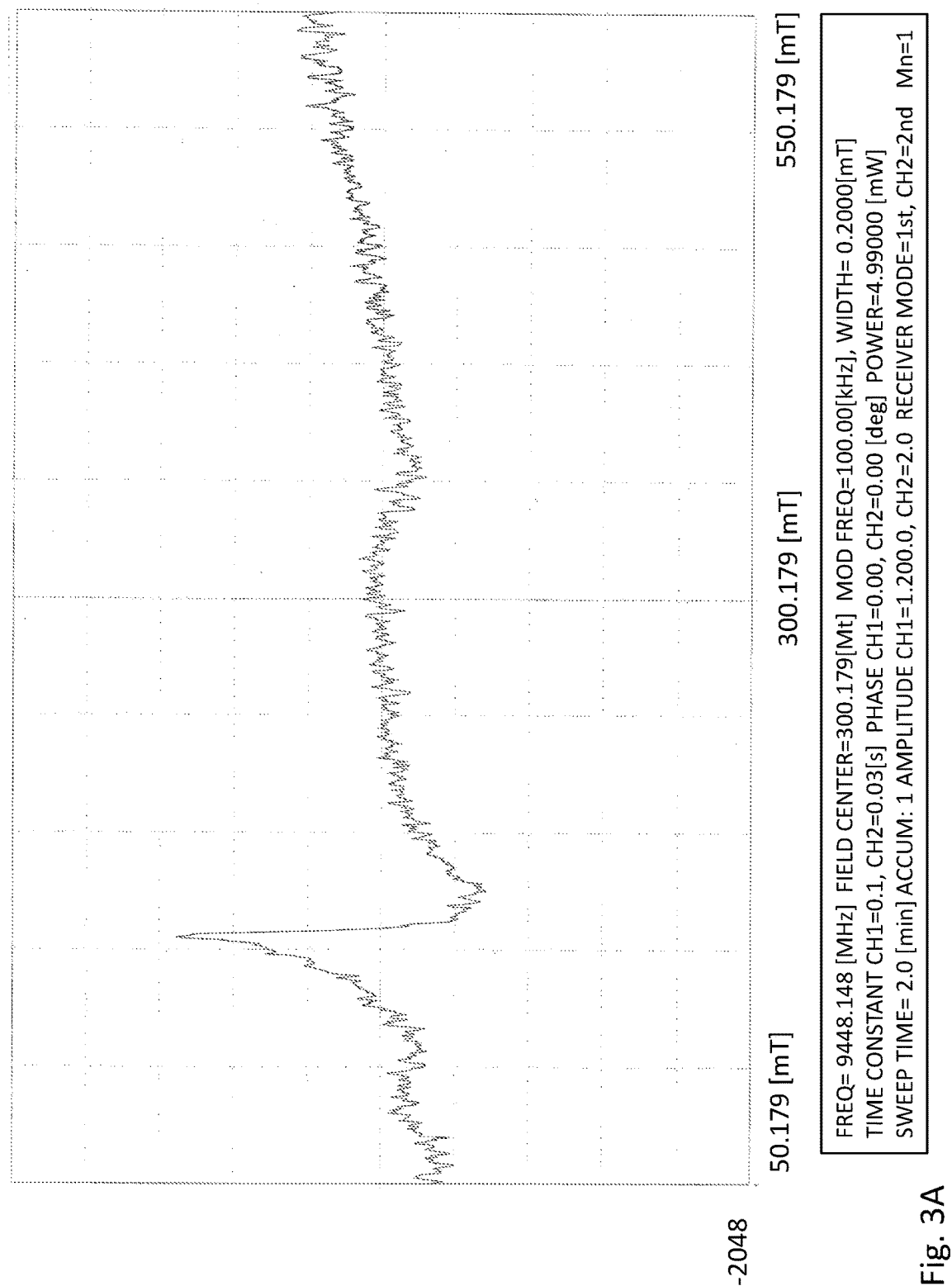
FIGS. 3a and 3b ESR spectra of Hg (a) before and (b) after the Hg is treated with a mineral acid to form a mercury based compound.
Figure 3B:
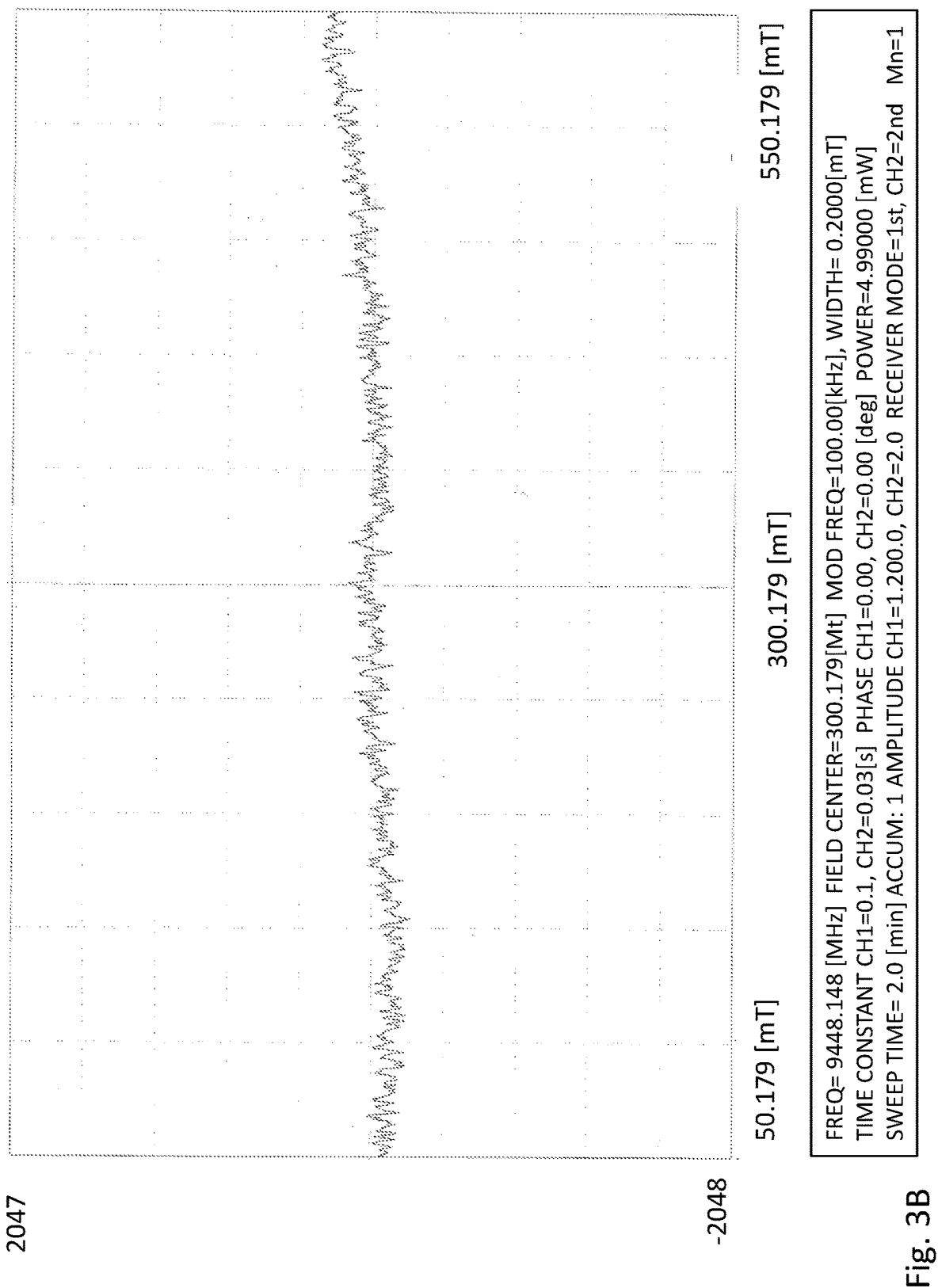

FIGS. 3a and 3b show respective ESR images of the mercury (FIG. 3a) used to make the mercury based compound and of the mercury based compound (FIG. 3b). FIG. 3a shows the expected spectrum for naturally occurring mercury. Following the production of the mercury based compound the mercury based compound is found to be paramagnetic, as is indicated by the peak in the spectrum of FIG. 3b. Thus, on the production of the mercury based compound a previously non-paramagnetic compound is transformed into a paramagnetic based compound.

Figure 4:
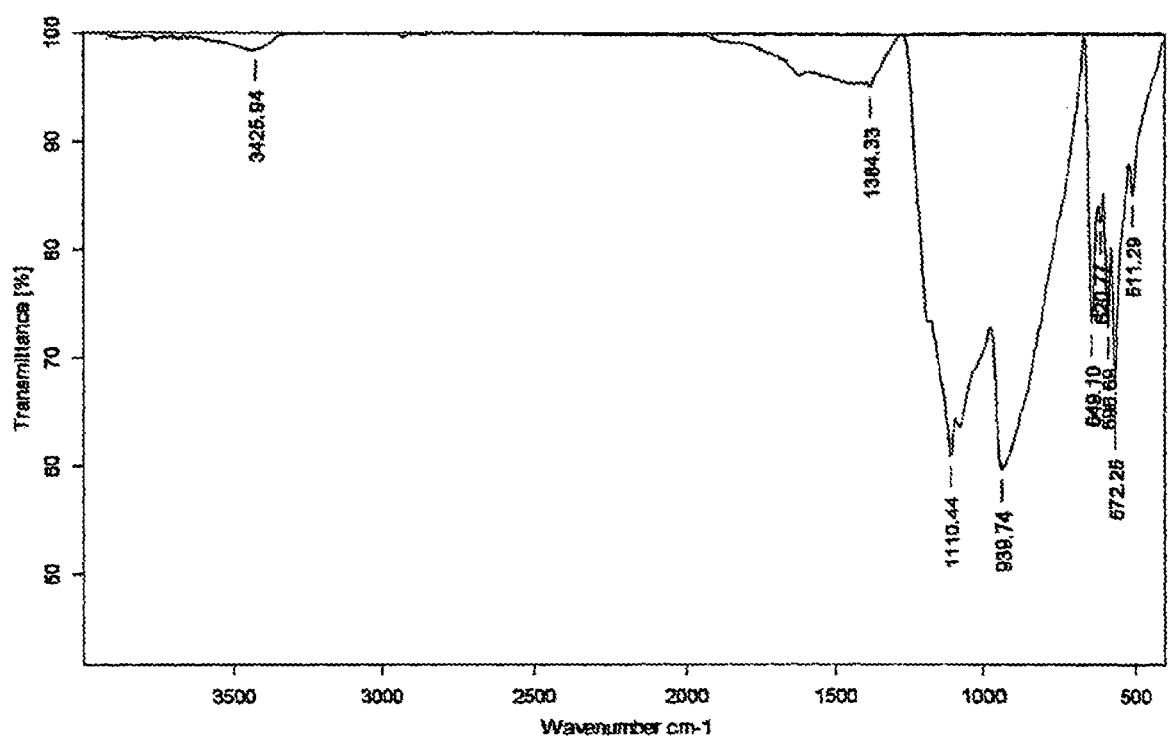
FIG. 4 an FTIR spectrum of the mercury based compound 8 produced by way of the method described herein.

FIG. 4 shows a Fourier Transformed Infrared Spectrum (FTIR) of the mercury based compound 8. The peaks seen in the spectrum hint at the respective presence of amines, alcohols, bromoalkanes, chloroalkanes and esters.

Similar peaks can be seen in the spectra associated with the remaining mercury based compounds 1 to 10. These are listed in table 3 in the following. The peaks shown in FIG. 4 and those listed in table 3 indicate that the mercury based powder is not composed of pure Hg, but includes different compounds. The compounds included show traces of H, C, O, and N and are thus organometallic compounds.

| Compound | Peak | Peak | Peak | Peak | Peak | Peak |
|---|---|---|---|---|---|---|
| 1 | 454.64 | 576.81 | 850.21 | 1006.95 | 1174.30 | 1611.60 |
| 2 | 577.28 | 655.83 | 1082.78 | 1383.60 | 1613.22 | 3585.44 |
| 3 | 615.87 | 1023.71 | 1381.47 | 1630.89 | 2919.99 | 3435.09 |
| 4 | 563.14 | 802.34 | 1290.10 | 1366.09 | 1612.78 | 3585.31 |
| 5 | 581.23 | 659.89 | 1070.03 | 1174.66 | 1613.36 | 3585.85 |
| 6 | 465.72 | 561.10 | 1036.19 | 1358.60 | 1613.30 | 3526.81 |
| 7 | 575.98 | 1006.72 | 1288.40 | 1609.49 | 2900.27 | 3582.32 |
| 8 | 572.25 | 596.69 | 939.74 | 1110.44 | 1384.33 | 3425.94 |

-continued

| Compound | Peak | Peak | Peak | Peak | Peak | Peak |
|---|---|---|---|---|---|---|
| 9 | 561.50 | 981.12 | 1382.35 | 1495.26 | 3527.89 | 3589.72 |
| 10 | 463.64 | 559.83 | 1022.44 | 1612.62 | 3525.18 | 3584.84 |

Table 3 shows some of the most prominent peaks (wavenumber $cm^{-1}$) present in the FITR spectrum of the respective compounds 1 to 10. The six peaks shown are not always the most prominent peaks but are arbitrarily selected to show the variety of peaks present in the spectrum.

In the following results of mixing the mercury based compound 8 with various target materials will be discussed.

Figure 5A:
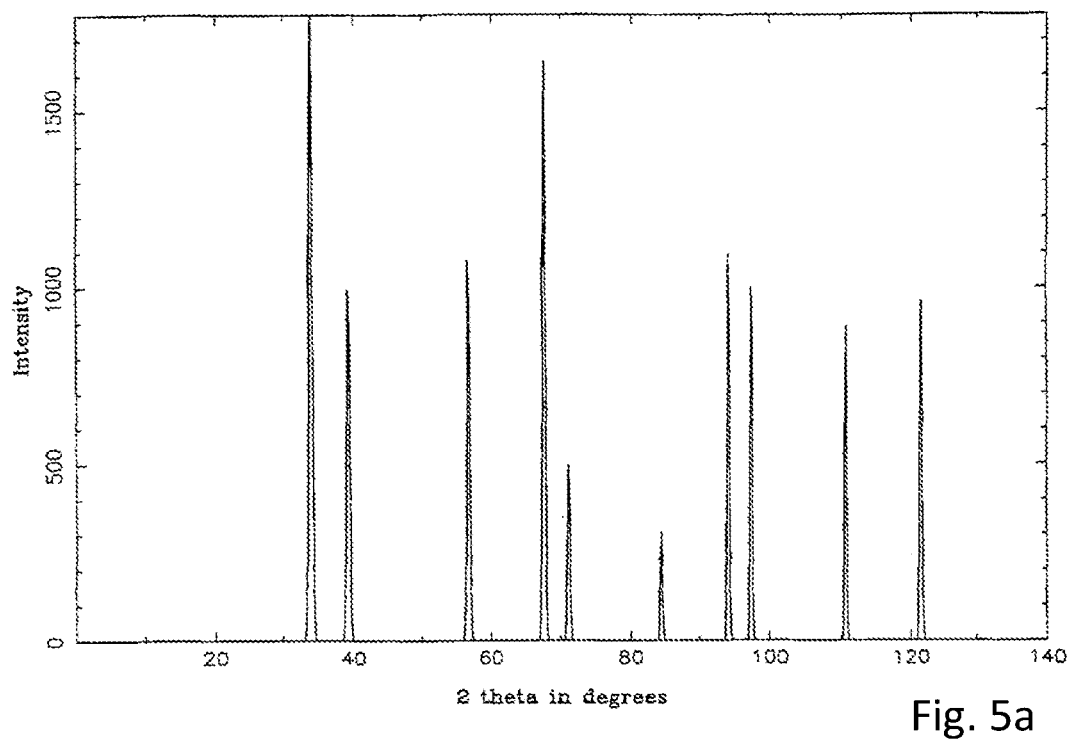
Figure 5D:
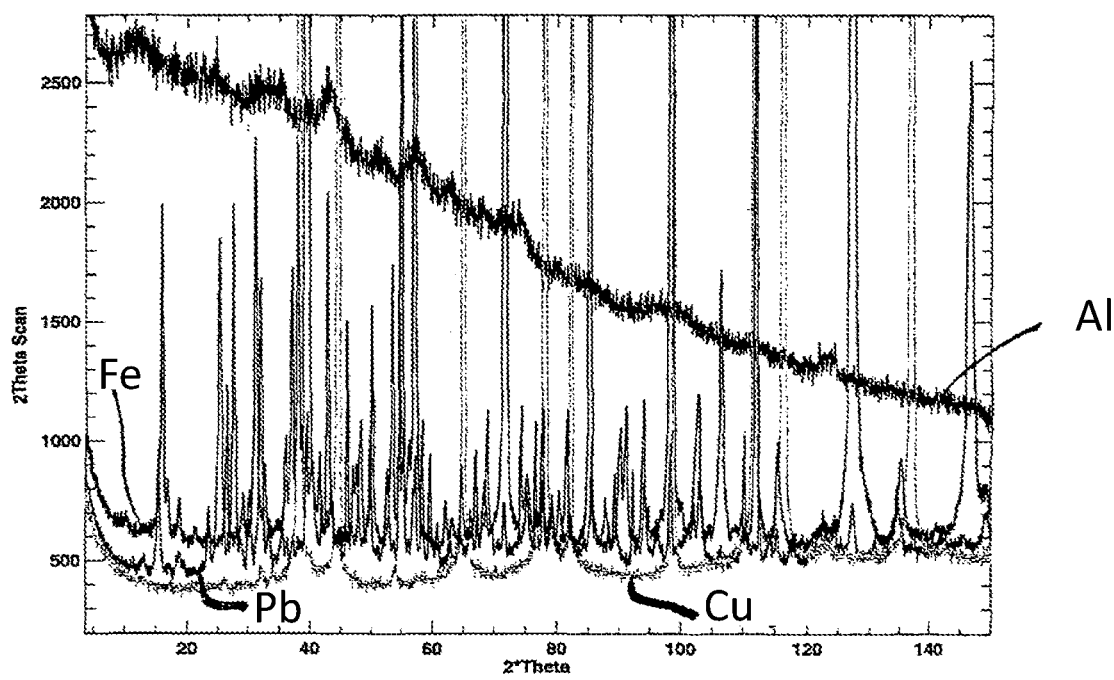
Figure 5B:
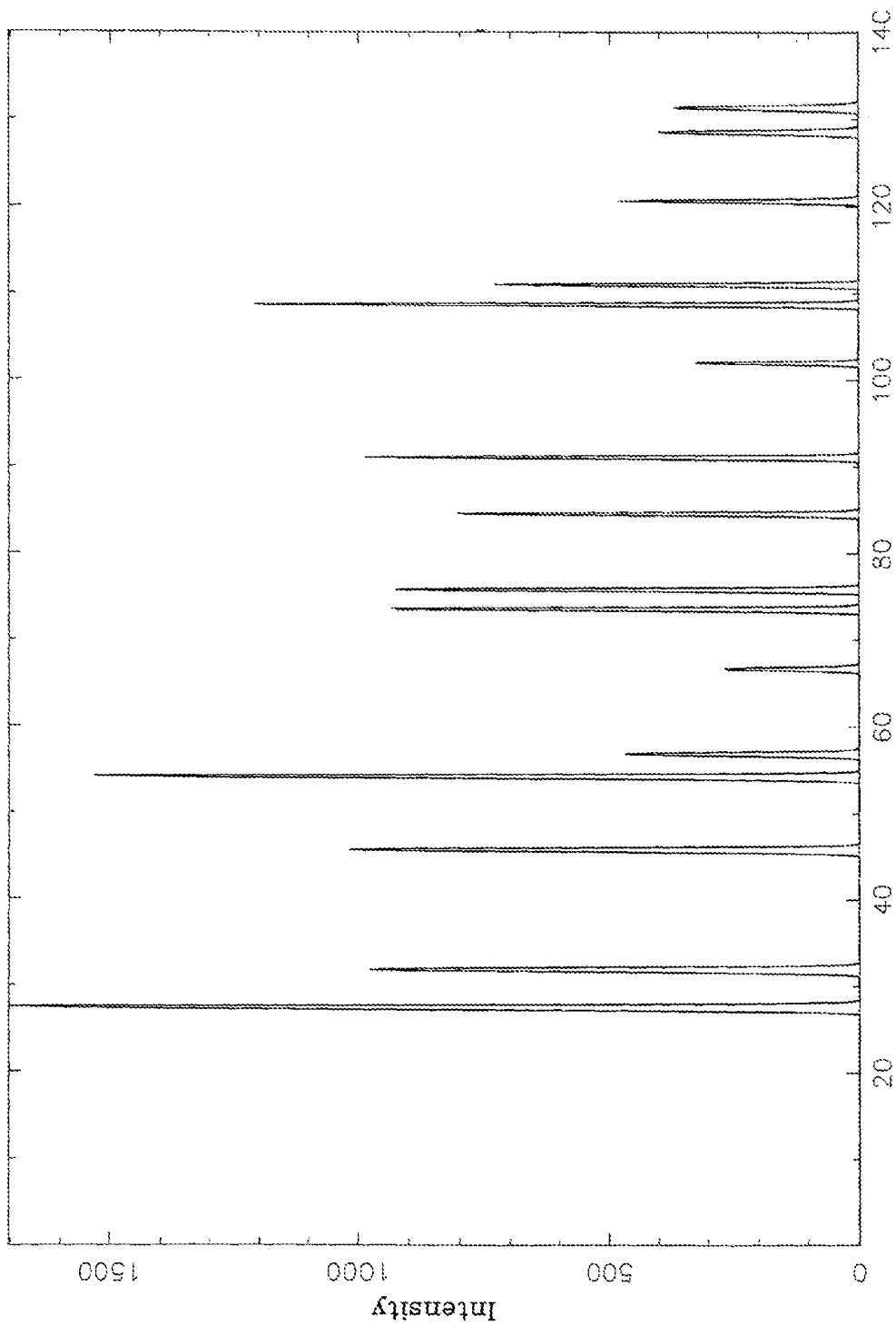

FIG. 5a in this connection shows neutron powder diffraction results of pure Al, FIG. 5b shows neutron powder diffraction results of pure Pb, FIG. 5c shows neutron powder diffraction results of pure Cu, whereas FIG. 5d shows neutron powder diffraction results of various target materials reacted with the mercury based compound 8. The spectrum of the pure metals shown in FIGS. 5a to 5c show the peaks that are generally associated with Al, Pb and Cu respectively.

In order to bring about the reaction between e.g. the Al and the mercury based compound 8, the Al was provided as a foil of Al and the mercury based compound was brought into contact with the Al in a container. As the reaction took place heat and subatomic particles were produced along with many new elements and the previously crystalline Al was transformed into an amorphous Al. The reactions described below in tables 4 and 5 were carried out in order to produce the reaction with Pb and Cu target material.

The neutron powder diffraction results of FIG. 5d shows 4 different curves. One of these curves shows that the Al has been transformed from an essentially crystalline form of Alto an amorphous form of Al. The other three curves show respective results of neutron powder diffraction for target elements Pb, Fe, and Cu. Also these elements have transmuted into many other elements and have crystal defects and result in a porous structure and show peaks that are not generally associated with the pure target material. It is believed that the change from crystalline Al to amorphous Al is due to the fact that the mercury based compound acts as a source of energy that is capable of changing the structure of the target material, this is also believed to be the explanation for the change in the crystal structure present in the curves relating to Pb, Fe, and Cu.

Glow Discharge Mass Spectroscopy (GDMS) data of the Al target material in foil form reacted with the mercury based compound shows the presence of many new elements alloyed with the Al, such as H, C, O, Si, S, Se, Zr, Ba, W, Au, Pt, Ir, Ti.

The change in the structure of the target element is confirmed by conductivity tests conducted on samples of copper that has been used as a molten target element and that has been mixed with the mercury based compound 8. The test equipment used was a Technofour Conductivity Meter, Type: 979 (CM 979). In these conductivity tests the conductivity of the Cu that reacted with the mercury based compound was found to be approximately 80% of the International Annealed Copper Standard (conversion value in Meter—46.63, 46.45, 46.69 σ mm2 Siemens respectively for the 3 samples measured) indicating that also in this case a change in the electronic structure of the copper was brought about on the addition of the mercury based compound 8 to copper target material (see table 5 below).

Figure 6A:
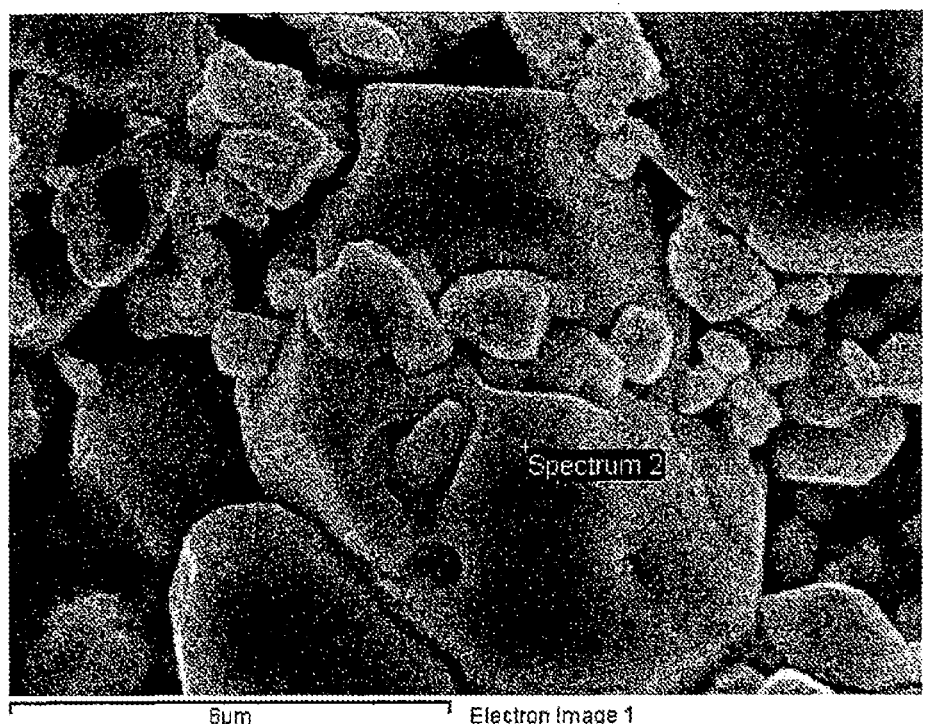
FIGS. 6a and 6b SEM-EDS images of (a) a mercury based compound 8 and (b) of said mercury based compound 8 mixed with Fe target material.
Figure 6B:
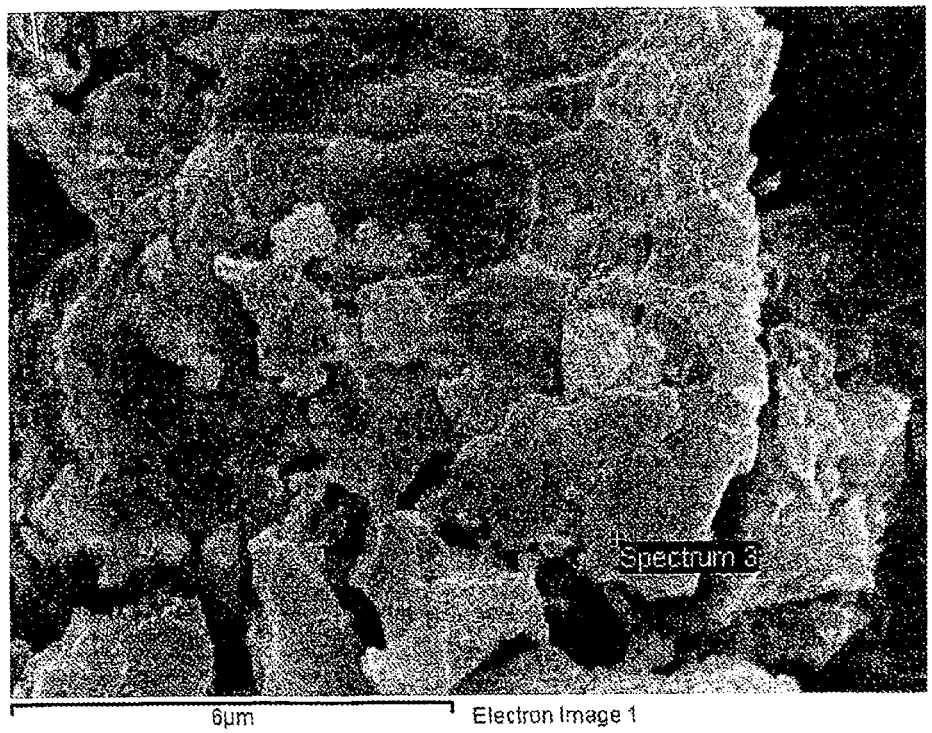

FIG. 6a shows an SEM-EDS (scanning electron microscopy coupled with Energy dispersive Xray) image of mercury based compound 8 (see table 3 for the analysis results thereof). The powder has crystals ranging from 1 μm to 10 μm in size. The powder appears to have a very crystalline form as would be expected for a pure metal compound. Following the addition of the mercury based compound to a molten bath of iron (Fe) in a process similar to that discussed in relation with Tables 4 and 5 in the following an SEM image of the resultant Fe compound was taken, the resultant image is shown in FIG. 6b. The resultant structure is not crystalline as would be expected. It rather appears porous. Thus, a change of the electronic structure of the Fe is brought about through the addition of the mercury based compound 8. Moreover, analyzing the resultant Fe compound shows the presence of not only Fe, but also of C, O, CI, Cu, Ti, Ru, Na, Si, S, Au, and Ca alloyed with the Fe.

Figure 7A:
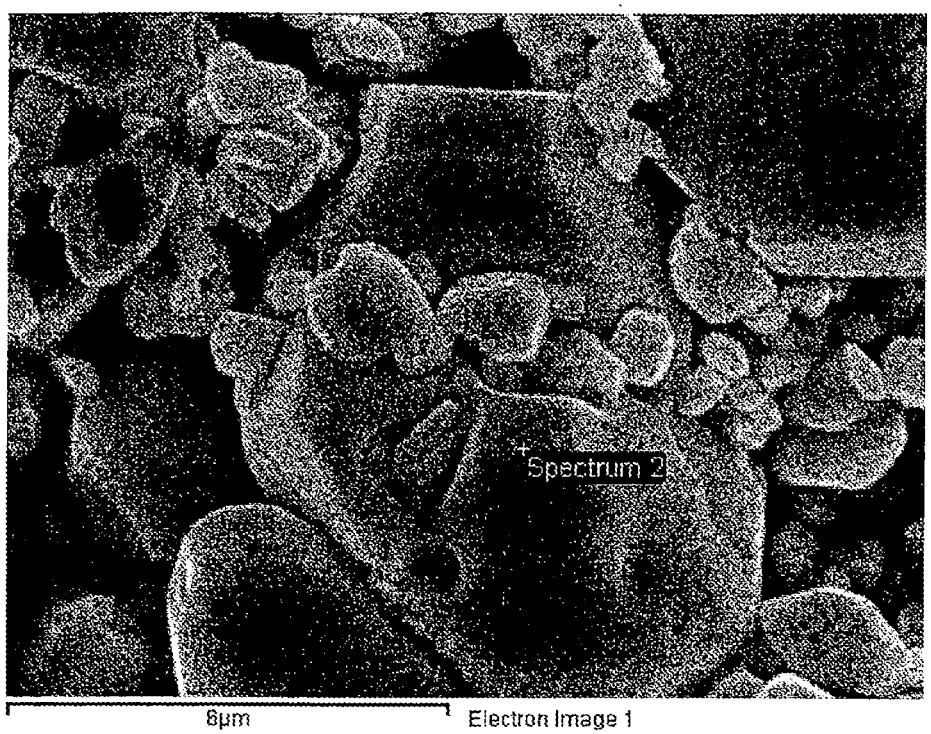
FIGS. 7a and 7b SEM-EDS images of (a) a mercury based compound 8 and (b) of the mercury based compound 8 mixed with Ni target material.
Figure 7B:
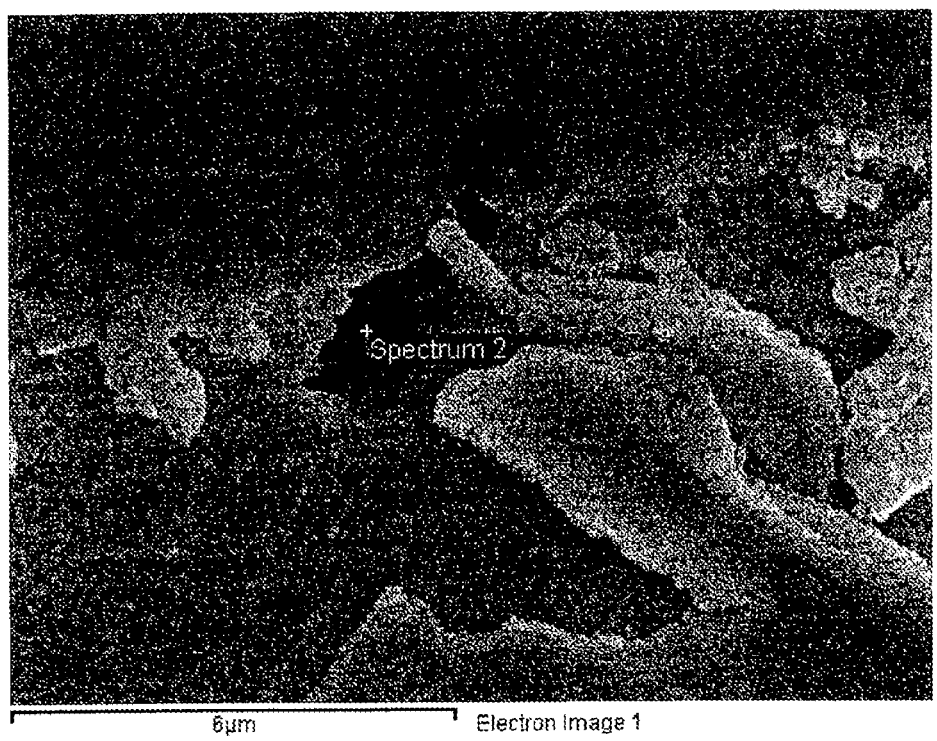

FIGS. 7a and 7b show SEM-EDS images similar to those of FIGS. 6a and 6b. The Fe was however replaced with Ni as a target element. Also in this instance the expected crystalline structure of the Ni can no longer be seen, but rather also a porous form of Ni appears to be present. Moreover, the resultant Ni compound was analyzed and in addition to the presence of Ni, also C, CI, K, Fe, and O was found to be present. Hence the Nickel also alloyed with many new elements produced as fusion products.

Figure 8A:
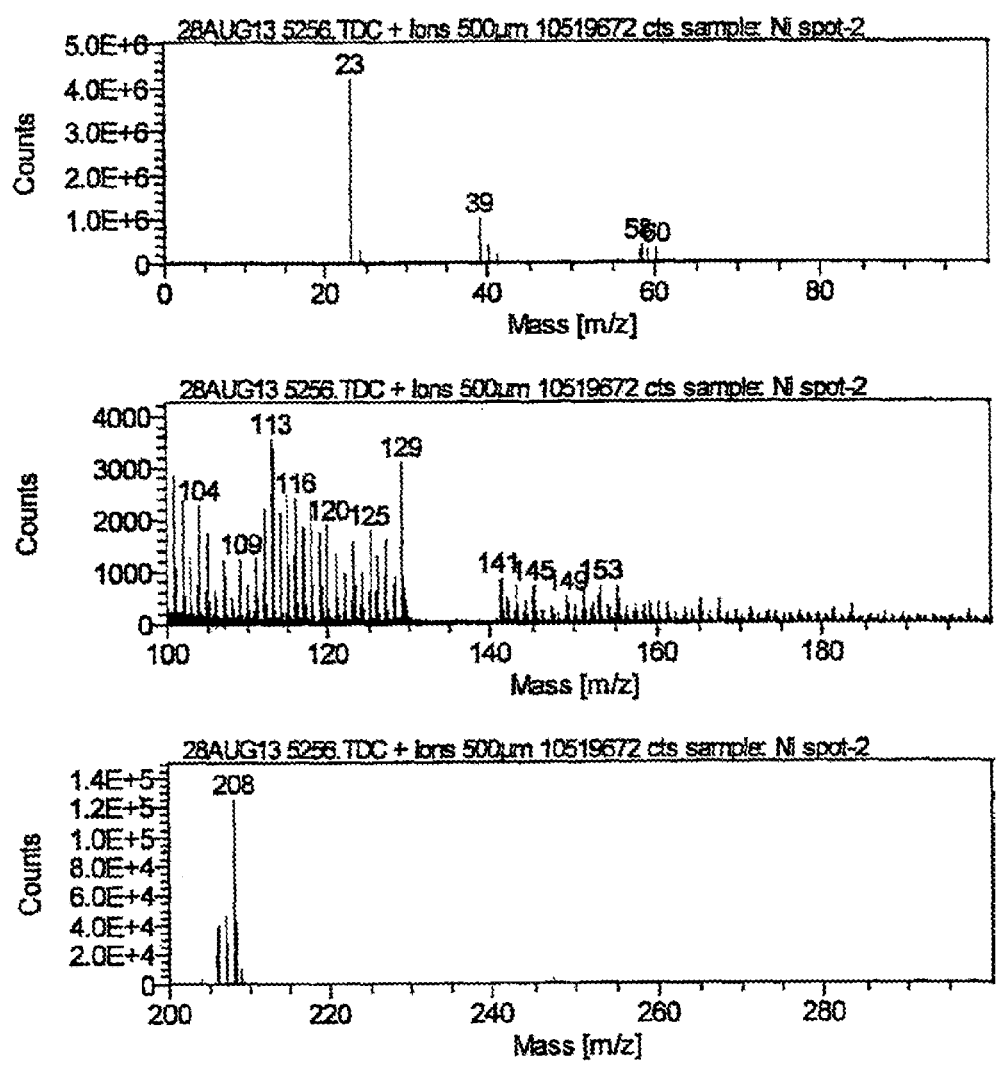
Figure 8B:
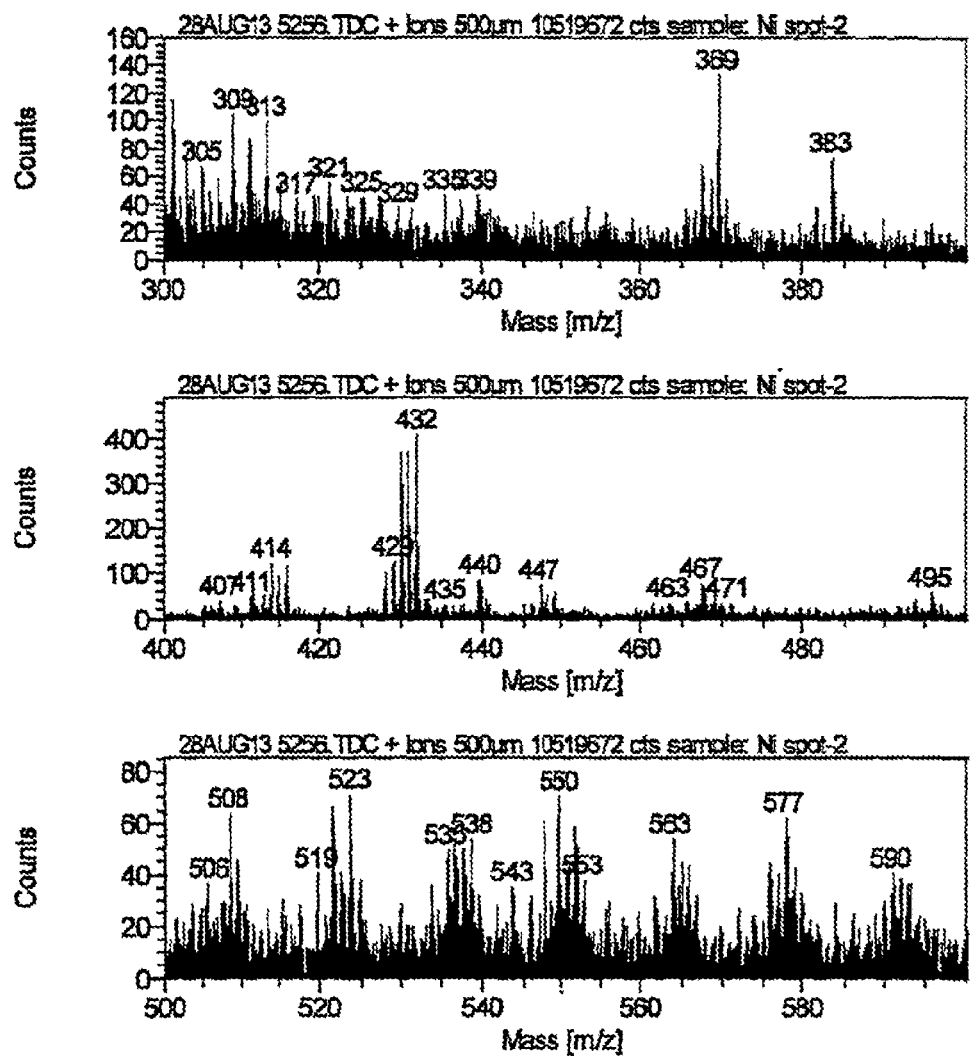

FIGS. 8a and 8b show a complete TOF-SIMS spectrum of the mercury based compound 8 reacted with Ni target material. The various spectra (3 in FIGS. 8a and 3 in FIG. 8b) of the spectrum show the number of counts per mass of the resultant Ni compound. A variety of peaks can be seen in the different spectra.

As the sample metal which was combined with the mercury based compound is nickel (purity of better than 99.0%) one would expect to see two clear peaks in the spectrum, namely one for nickel around mass number 58 and one for mercury at around a mass of 200. Inspecting the spectrum the two most significant peaks (counts/per mass) present are at 23 and around 208.

Inspecting the different spectra further, a variety of further peaks can be seen. Surprisingly these peaks are associated with elements that were previously not expected. For example, for the peak centered around 102.91 [amu] (FIG. 8a). shows the presence of Rh and HRu, as an organometallic compound of high density elements like Au, Ag, and PGM (Platinum group metals).

For the peak centered around 144.94 [amu] (FIG. 8a) one observes the presence of C2H5NRu and C3H6Rh. The peaks respectively centered at approximately 206, 207, 208 and 246 [amu] (FIG. 8a) are indicative of the presence of $CH_2Os$, $C_4H_{10}NO_2Ru$, $CH_2Ir$, $C_4H_{10}OCs$, $C_3H_8N_4Ag$, $C_3H_{10}N_2O_2Ru$, $H_2NOs$, $C_2H_8N_5Pd$, $CH_8N_5ORu$, $C_4H_{12}NO_2Rh$, $CH_4Ir$, $C_2H_1N_4ORh$, $C_7N_4Ag$, $C_5H_5O_5Ru$, $CH_5N_2O_6Pd$, $C_3H_3N_3O_4Ru$, $C_9H_2NOAg$ and $C_6H_4O_4Ag$.

This is somewhat surprising as these elements are not normally associated as being contaminants of substantially pure Ni. It is believed that the mercury based compound acts as a source of energy that causes a reaction to take place in which transmutation of some elements occurs.

Similar results are obtained when inspecting TOF-SIMS spectra of the Cu metal compound produced once copper target material has been mixed with the mercury based compound 8. In these spectra the presence of Cu, Rh, Pd, O, $CH_2$, Ru, C, and Ag can be seen.

Some of the Examples of the mercury based compound previously discussed were added to a molten lead bath and to a molten copper bath respectively. The reactions are discussed in the following tables. The lead metal used was granular and LR grade (make SD Fine Chem. Ltd SDFCL 500 g pack—H 123/4521/2302/13 39014 K05). The minimum assay of the lead was 99.0% and had maximum limits of impurity of Fe 0.01% and Cu 0.01%.

| Process No. | Amount of lead | Temperature of lead | Compound | Amount of Compound | Time for reaction |
|---|---|---|---|---|---|
| 1 | 30 g | 700° C. | 1 | 300 mg | 5 mins |
| 2 | 30 g | 700° C. | 2 | 270 mg | 5 mins |
| 3 | 30 g | 700° C. | 5 | 360 mg | 5 mins |
| 4 | 30 g | 700° C. | 6 | 570 mg | 5 mins |
| 5 | 30 g | 700° C. | 7 | 390 mg | 5 mins |
| 6 | 30 g | 700° C. | 8 | 360 mg | 5 mins |
| 7 | 30 g | 700° C. | 9 | 500 mg | 5 mins |
| 8 | 30 g | 700° C. | 10 | 500 mg | 5 mins |

Table 4 shows reaction parameters for reacting Pb with the mercury based compound.

In general the mercury based compound was added to the metal lead that was heated to the molten state, i.e. to 700° C., this means above the melting point of the target element, in a graphite crucible that was heated in a furnace (electric, coal, oil, gas fired). Once the lead was heated until it was red hot, i.e. present in the molten state, the compound was added to the molten lead and the reaction was allowed to take place for a certain period of time while the mixture was stirred with e.g. a graphite rod. Following this the graphite crucible was removed from the furnace and allowed to cool down to room temperature so as to solidify the lead to a metal button.

In order to mix copper with the mercury based compound the same steps were carried out the difference being that the copper was heated to a different temperature, i.e. to 1200° C., this means above the melting point of the target element, to obtain the molten state. The copper used was copper metal turning LR grade (make SD Fine Chem. Ltd. SDFCL 500 gm pack—specifications L13 A/1513 2211/13-37812 K05). The copper has a minimum assay of 99.5% and 0.05% of the substances were insoluble in nitric acid.

| Process No. | Amount of copper | Temperature of copper | Compound | Amount of Compound | Time for reaction |
|---|---|---|---|---|---|
| 1 | 30 g | 1200° C. | 1 | 480 mg | 5 mins |
| 2 | 30 g | 1200° C. | 2 | 480 mg | 5 mins |
| 3 | 30 g | 1200° C. | 5 | 570 mg | 5 mins |
| 4 | 30 g | 1200° C. | 6 | 575 mg | 5 mins |
| 5 | 30 g | 1200° C. | 7 | 460 mg | 5 mins |
| 6 | 30 g | 1200° C. | 8 | 410 mg | 5 mins |
| 7 | 30 g | 1200° C. | 9 | 150 mg | 5 mins |
| 8 | 30 g | 1200° C. | 10 | 500 mg | 5 mins |

Table 5 shows reaction parameters for reacting Cu with the mercury based compound.

Figure 9:
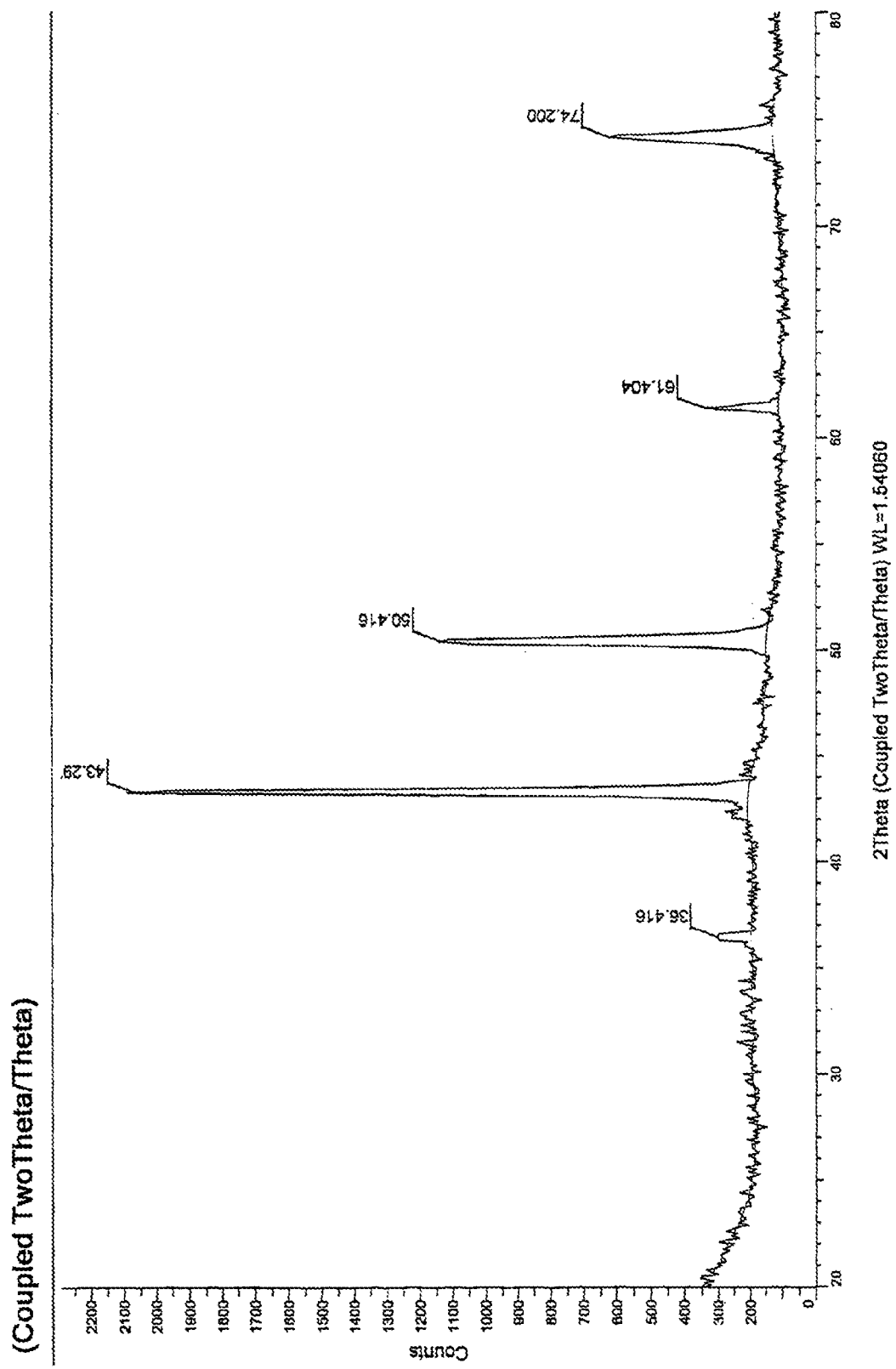
FIG. 9 an XRD spectrum of the mercury based compound 8 mixed with copper target material.

FIG. 9 shows an XRD spectrum of the resultant copper compound once mercury based compound 8 has been added to the molten copper target material (see Table 5). The same spectrometer was used as that used to measure the spectra shown in FIG. 1. Respective peaks centered at around 36.416, 43.29, 50.416, 61.404 and 74.200 can be seen. On conducting these diffraction patterns it was not apparent which materials all of these peak correspond to. This indicates that not only copper but also other materials are present in the resultant copper compound. A corresponding SEM-EDS measurement yields that only 96.37% by weight of copper remain in the sample and that 3.63% by weight of carbon is present in one sample of the investigated resultant copper compound. In a second sample only 71.09% by weight copper is found and the remaining copper compound yields 25.11% by weight carbon and 3.8% by weight of oxygen. These results are highly surprising and unexpected.

In this connection it should be noted that impurity atoms or alloying atoms are produced by nuclear transmutations due to the addition of the mercury based compound to a molten bath of target material, with the mercury based compound reacting with the nuclei of target material. Fusion products, such as H, C, N, O, S, and subatomic particles are generated during nuclear transmutation. The significant presence of both C and O in the SEM-EDS measurements of previously pure copper that has been reacted with the mercury based compound could thus be explained by nuclear transmutation reaction products.

Inspecting the TOF-SIMS results obtained (see FIGS. 8a to 8b) following the reaction of Ni target element with the mercury based compound can also be explained on the basis of nuclear transmutation.

The invention will be described in the following using the language of the inventor:

The present disclosure relates to a metal compound of general Formula (I)

$$M^1X \qquad \text{Formula I}$$

'$M^1$' is selected from a group comprising but not limiting to Mercury Metal (Hg), $M^xM^y$ and a combination thereof; wherein $M^x$ is but not limiting to Mercury Metal (Hg), and $M^y$ is one or more element of the periodic table other than Mercury Metal (Hg): and 'X' is selected from a group comprising but not limiting to halide, sulphate, nitrate and combination thereof.

In a clause of the above Formula (I), the halide is selected from a group comprising chloride, bromide, fluoride and iodide.

In a clause, the present disclosure relates to the metal compound of general Formula (I1) having energy.

In another clause, the metal compound of general Formula (I) is employed as an energy source.

The present disclosure further relates to a process for preparing a metal compound of general Formula (I)

$$M^1X \qquad \text{Formula I}$$

'$M^1$' is selected from a group comprising but not limiting to Mercury Metal (Hg), $M^xM^y$ and a combination thereof, wherein $M^x$ is but not limiting to Mercury Metal (Hg), and $M^y$ is one or more element of the periodic table other than Mercury Metal (Hg), and 'X' is selected from a group comprising but not limiting to halide, sulphate, nitrate and combination thereof, wherein said process comprises reacting metal M with acid to obtain the compound of Formula (I).

In a clause, the metal '$M^1$' is selected from a group comprising but not limiting to Mercury Metal (Hg), $M^xM^y$ and a combination thereof, wherein $M^x$ is but not limiting to Mercury Metal (Hg), and $M^y$ is one or more element of the periodic table other than Mercury Metal (Hg).

In another clause, the acid is selected from a group comprising inorganic acid, organic acid and a combination thereof.

In yet another clause, the acid is selected from a group comprising but not limited to HCl, $HNO_3$, $H_2SO_4$ and combinations thereof.

In still another clause, the process of preparation of compound of Formula (I) is optionally carried out in presence of a solvent. In another clause, the solvent is selected from a group comprising polar solvent, non-polar solvent and a combination thereof.

In still another clause, the process of preparation of compound of Formula (I) optionally comprises steps selected from a group comprising stirring, heating, isolation and combinations thereof.

In still another clause, the process of preparation of compound of Formula (I) is carried out at a temperature starting from room temperature.

The present disclosure relates to the application of compound of Formula (I) for the conversion of target element(s) into other element(s). The present disclosure also provides a method of conversion of target element(s) into other element(s) by employing the compound of Formula (I).

In a clause, the conversion of target element is carried out by reacting the compound of Formula (I) with said target element. In another clause, the compound of Formula (I) converts the target element into other elements including organometallic compounds of higher density elements, low mass elements, high mass elements, hydrocarbons, gold, silver, platinum group metals and rare earth elements, or any combination thereof.

In another clause, the compound of Formula (I) reacts with the nucleus of the target element and converts the target element into other elements. In another clause, some percentage of the target element in the aforesaid reaction is converted to other elements.

In yet another clause, the target element is selected from a group comprising iron to bismuth or any combination thereof, $M^A E$ and a combination thereof, wherein '$M^A$' is any element selected from iron to bismuth or any combination thereof; 'E' is selected from one or more element of the periodic table other than iron to bismuth. In still another clause, the target element is present in molten state, gaseous state, liquid state or solid state, or any combination thereof. In a preferred clause, the target element is present in molten state or liquid state.

As used in the present disclosure, the term 'element' includes the elements of the periodic table and its isotopes.

The present disclosure also relates to the application of compound of Formula (I) for conversion of target element(s) into other element(s) and release/generation of energy. The present disclosure further provides a method of conversion of target element(s) into other element(s) and release/generation of energy by employing the compound of Formula (I).

In a clause, the energy is released/generated by reacting the compound of Formula (I) with a target element. In another clause, the compound of Formula (1) converts the target element into other elements and releases/generates energy.

In still another clause, the compound of Formula (I) reacts with the nucleus of the target element and converts the target element into other elements and releases/generates energy.

In another clause, the target element is selected from a group comprising hydrogen to manganese or any combination thereof, $M^B F$ and a combination thereof, wherein '$M^B$' is any element selected from hydrogen to manganese, or any combination thereof;

'F' is selected from one or more element of the periodic table other than hydrogen to manganese.

In still another clause, the target element is present in gaseous form, solid form, liquid form or molten state.

In another clause, released/generated energy is used for production of electricity, fuel and other applications related to energy.

In still another clause, the compound of Formula (I) reacts with a target element selected from one or more element of the periodic table and converts said target element into other elements and releases/generates energy. In another clause, the released/generated energy is used for production of electricity, fuel and other applications related to energy. In yet another clause, the target element is present in solid state, gaseous state, molten state or liquid state.

It is believed that the energy released during the reaction is in the form of heat and/or subatomic particles, such as $\gamma$ Photons, $\beta$-Electrons, p or 1H-protons, n-Neutron, d or 2D-Deuterons, t or 3T-tritons, $\alpha$- or 4He-particles.

It should further be noted that the mercury based compound can be added to any element available and it is believed that the mercury based compound can be used to react with the nucleus of the target elements/isotopes and converts target elements into many other elements, such as radionuclides for medical applications, actinides, trans-actinides, i.e. so-called super heavy elements, as well as to produce so-called missing elements like Tc, Pm and At.

Further applications related to energy are the use of the mercury based compound for fuel for Jet Propulsion, as a nuclear battery for space flight, satellites and remote area access and for the production of charged particles for aneutronic fusion.

It should also be noted that the mercury based compound can be used in the production of organometallic compound of high density elements (Au, Ag, PGM bond with low mass elements, i.e. lighter elements like H, C, N, O, S, etc.), high density elements (Au, Ag, PGM Nano particle and micron size particles, low mass elements, high mass elements, and rare earth elements.

The invention claimed is:

1. A method of fabricating a mercury-based compound, wherein said mercury-based compound is paramagnetic and is present in an excited state, the method comprising the steps of:
    adding a pure mineral acid or a solution of mineral acid, and liquid mercury to a container;
    reacting the liquid mercury and the mineral acid to form a mixture; and
    drying the mixture to form the mercury-based compound in powder form;
    wherein a ratio of said mineral acid to said liquid mercury is in a range of 0.1:1 to 10:1 (mL of the mineral acid to gram of the liquid mercury), and
    wherein the step of drying is carried out at a temperature of 80° to 150° C. for 30 minutes to 10 hours.

2. The method according to claim 1, wherein the mineral acid is added to the container before, after or during the addition of the liquid mercury.

3. The method according to claim 1, wherein the mineral acid comprises at least one acid selected from the group consisting of aqua regia, $HNO_3$, HCl, and $H_2SO_4$.

4. The method according to claim 1, wherein the ratio of said mineral acid to said liquid mercury is in the range of 1:1 to 2:1 (mL of the mineral acid to gram of the liquid mercury).

5. The method according to claim 1, wherein the step of drying is carried out the temperature of 90° to 140° C. for 30 minutes to 10 hours.

6. The method according to claim 1, further comprising the step of adding a solvent, wherein the solvent is selected from the group consisting of a polar solvent, a non-polar solvent, and combinations thereof.

7. The method according to claim 6, wherein said polar solvent is formic acid, ethanol, acetone, ammonia, or acetic acid.

8. The method according to claim 6, wherein said non-polar solvent is toluene or benzene.

9. The method according to claim 1, further comprising the step of separating residual liquid from the mixture prior to drying the mixture.

10. The method according to claim 1, further comprising at least one of the following steps:
maintaining an initial temperature of the mixture at room temperature;
heating the mixture; and
isolating compounds that do not contain liquid mercury from the mixture;
wherein the addition of the liquid mercury to the container precedes the addition of the mineral acid to the container.

11. The method according to claim 10, wherein the step of heating the mixture is carried out up to a temperature at which the mineral acid is evaporated to dry the mercury based compound.

12. A method of producing metal compounds and metal elements in an endothermic reaction, the method comprising the steps of:
providing a metal target material in the molten state with the metal target material having a proton number of greater than or equal to 26 as a molten metal target material, and
adding the mercury-based compound fabricated by the method according to claim 1 to the molten metal target material;
wherein the mercury-based compound reacts with the metal target material to transmutate elements to produce low mass elements and heavier elements.

13. The method according to claim 12, wherein a bath of the molten metal target material includes between 10 g and 1000000 kg of said molten metal target material.

14. The method according to claim 13, wherein the mercury-based compound is added to the metal target material in the amount between 1 mg to 100 kg.

15. The method according to claim 14, wherein said metal target material is in a liquid phase, a gaseous phase or a solid phase.

16. The method according to claim 13, wherein a mass ratio between the mercury-based compound and the metal target material is from 1:100000 to 1:100.

17. The method according to claim 16, wherein the mass ratio between the mercury-based compound and the metal target material is 1:10000.

18. The method according to claim 13, wherein the mercury-based compound is in an excited state and is employed as a source of energy reacting with nuclei of the metal target material in order to create elements having a higher proton number or neutron number.

19. A method of producing metal compounds and metal elements in an exothermic reaction in a container, the method comprising the steps of:
providing target material with the target material having a proton number of less than or equal to 28, and
adding the mercury-based compound fabricated by the method according to claim 1 to the metal target material;
wherein the mercury-based compound reacts with the metal target material to release energy and transmutate elements to produce low mass elements and heavier elements.

20. The method according to claim 19, wherein the target material is present in a gaseous phase, a liquid phase or a solid phase of matter.

21. The method according to claim 19, wherein the mass ratio between the mercury-based compound and the target material is selected from the range 1:100000 to 1:100.

22. The method according to claim 21, wherein the mass ratio between the mercury-based compound and the metal target material is 1:10000.

23. The method according to claim 19, wherein the mercury-based compound is added in a powder form or in the form of a slurry.

24. The mercury-based compound obtained by the method of claim 1 for use in production of energy, transmutation of elements, application relating to energy, formation of organometallic compounds for industrial and medical applications, production of high-density elements, production of rare earth elements or production of heavy elements.

25. The method according to claim 12, wherein the low mass elements are hydrocarbons.

26. The method according to claim 19, wherein the low mass elements are hydrocarbons.

* * * * *